United States Patent
Arai et al.

(10) Patent No.: US 10,113,931 B2
(45) Date of Patent: Oct. 30, 2018

(54) PROBE MEASURING FORCE ADJUSTER

(71) Applicant: MITUTOYO CORPORATION, Kanagawa (JP)

(72) Inventors: Hideyuki Arai, Tokyo (JP); Kazuhiko Hidaka, Tokyo (JP); Minoru Tanaka, Utsunomiya (JP); Tomoyuki Miyazaki, Kawasaki (JP); Takeshi Yamamoto, Zama (JP)

(73) Assignee: MITUTOYO CORPORATION, Kanagawa (JP)

( * ) Notice: Subject to any disclaimer, the term of this patent is extended or adjusted under 35 U.S.C. 154(b) by 296 days.

(21) Appl. No.: 15/092,065

(22) Filed: Apr. 6, 2016

(65) Prior Publication Data
US 2016/0299028 A1    Oct. 13, 2016

(30) Foreign Application Priority Data

Apr. 7, 2015 (JP) ................................ 2015-078516
Nov. 9, 2015 (JP) ................................ 2015-219444

(51) Int. Cl.
*G01B 7/008* (2006.01)
*G01L 25/00* (2006.01)

(52) U.S. Cl.
CPC .................... *G01L 25/00* (2013.01)

(58) Field of Classification Search
CPC ........... G01L 25/00; G01B 7/34; G01B 7/345; G01B 7/004–7/016; G01B 7/008
(Continued)

(56) References Cited

U.S. PATENT DOCUMENTS 7,204,033 B2 * 4/2007 Mies .................... G01B 21/047
                                                                33/503
9,303,968 B2    4/2016 Mori et al.
(Continued)

FOREIGN PATENT DOCUMENTS

| EP | 2251635 A2 | 11/2010 |
| JP | H11-141537 A | 5/1999 |
| JP | 2010-286475 A | 12/2010 |

OTHER PUBLICATIONS

U.S. Appl. No. 15/059,528 to Kazuhiko Hidaka et al., filed Mar. 3, 2016.

*Primary Examiner* — Robert R Raevis
(74) *Attorney, Agent, or Firm* — Greenblum & Bernstein, P.L.C.

(57) ABSTRACT

A stylus support portion moveable in an X direction is arranged separate from a fixed portion. A plate spring has a first end fixated to an end portion of the stylus support portion in an X (+) direction, a second end fixated to the fixed portion, and a principal surface facing the X direction. A plate spring has a first end fixated to an end portion of the stylus support portion in an X (−) direction, a second end fixated to the fixed portion, and a principal surface facing the X direction. A first permanent magnet is provided on the end portion of the stylus support portion in the X (+) direction. A second permanent magnet is provided on the end portion of the stylus support portion in the X (−) direction. A third permanent magnet is provided to the fixed portion so that a magnetic force in the X direction acts on an area between the first permanent magnet and the third permanent magnet. A fourth permanent magnet is provided to the fixed portion so that the magnetic force in the X direction acts on an area between the second permanent magnet and the fourth permanent magnet.

8 Claims, 34 Drawing Sheets

(58) Field of Classification Search
USPC ....... 248/542, 543, 682, 560, 580, 581, 583,
248/584, 585, 588, 591, 599, 610, 613,
248/614; 33/556–558, 559–561;
73/1.015, 865.5, 865.8, 104, 105
See application file for complete search history.

(56) References Cited

U.S. PATENT DOCUMENTS

| | | |
|---|---|---|
| 9,341,554 B2 | 5/2016 | Tsujii et al. |
| 2012/0147258 A1* | 6/2012 | Park .................... G02B 7/08 |
| | | 348/374 |
| 2014/0379103 A1* | 12/2014 | Ishikawa ................ G03B 5/00 |
| | | 700/56 |
| 2015/0292851 A1 | 10/2015 | Yamamoto et al. |

* cited by examiner

PROBE MEASURING FORCE ADJUSTER

CROSS-REFERENCE TO RELATED APPLICATIONS

The present application claims priority under 35 U.S.C. § 119 of Japanese Application No. 2015-078516, filed on Apr. 7, 2015, and Japanese Application No. 2015-219444, filed Nov. 9, 2015, the disclosure of which is expressly incorporated by reference herein in its entirety.

BACKGROUND OF THE INVENTION

1. Field of the Invention

The current invention relates to a probe measuring force adjuster.

2. Description of Related Art

In a coordinate measuring machine, a scanning measurement is performed by bringing a scanning probe into contact with a surface of a measured object (see, for example, Japanese Patent Laid-open Publication No. 2010-286475). When using an elastic hinge in a guide mechanism (in three axis directions of X, Y, Z) of the scanning probe, a measuring force of the probe is generated by a spring constant in a bending direction of the elastic hinge. The higher a rigidity of the guide mechanism is, the larger the spring constant becomes, and the larger the measuring force of the probe becomes. When the measuring force of the probe becomes large, certain influences are increased, such as an influence from a frictional force generated between a workpiece and a stylus during measurement and an influence from bending of the stylus mounted on the probe. As a result, highly accurate measurement becomes difficult.

By contrast, a technique of stabilizing the measuring force is known, in which fluctuation of the measuring force of the probe is inhibited by detecting and controlling the measuring force (Japanese Patent Laid-open Publication No. 2010-286475).

In addition, a technology is proposed for a measuring device using an elastic hinge mechanism in which a restoring characteristic of an elastic hinge is adjusted using magnets (Japanese Patent Laid-open Publication No. H11-141537).

However, inventors of the present invention have discovered an issue, as discussed below, with respect to the above-noted techniques. For example, in order to adjust the measuring force, the rigidity of the spring or the elastic hinge that provides the measuring force is lowered, and when the spring constant in the bending direction becomes small, the rigidity in another direction such as twisting or curving becomes lower as well. As a result, the influence of deformation other than in the bending direction due to the measuring force becomes greater and leads to deterioration in measurement accuracy. Accordingly, to achieve high accuracy of the scanning probe, a scanning probe with high rigidity in a direction other than a moveable direction and a small spring constant in the bending direction is required.

By contrast, in the technique disclosed in Japanese Patent Laid-open Publication No. 2010-286475, though the measuring force is adjustable, controlling the measuring force generates heat, which affects the form measuring machine in the form of thermal deformation and the like and leads to a decrease in measurement accuracy. In addition, electrical noise is generated by executing control of the measuring force, which leads to a further decrease in measurement accuracy. Furthermore, a need to mount a controller on the form measuring machine increases costs of the form measuring machine.

SUMMARY OF THE INVENTION

The present invention was conceived in light of the circumstances above, and the present invention adjusts a measuring force of a contact probe with a simple configuration.

One aspect of the present invention is a probe measuring force adjuster that includes a first member; a second member moveable in a first direction and arranged separate from the first member; a first plate-like elastic member having a first end fixated to a first end portion of the second member, a second end fixated to the first member, and a principal surface facing the first direction; a second plate-like elastic member having a first end fixated to a second end portion which second end portion is separated from the first end portion of the second member in the first direction, a second end fixated to the first member, and a principal surface facing the first direction; a first magnetic member provided to the first end portion of the second member; a second magnetic member provided to the second end portion of the second member; a third magnetic member provided to the first member and arranged separate from the first magnetic member so as to generate a magnetic force in the first direction between the first magnetic member and the third magnetic member; and a fourth magnetic member provided to the first member and arranged separate from the second magnetic member so as to generate the magnetic force in the first direction between the second magnetic member and the fourth magnetic member. Accordingly, a force acting upon the second member, i.e., the measuring force, can be a resultant force of a spring force and a magnetic force. Thereby, changes in the spring force and the magnetic force in response to a displacement of the second member can adjust the measuring force with a simple configuration.

Another aspect of the present invention is the above-noted probe measuring force adjuster in which the first through fourth magnetic members are permanent magnets. Thereby, heat occurring when using an electromagnet, and control noise occurring when using an actuator, can be prevented.

Another aspect of the present invention is the above-noted probe measuring force adjuster in which, one of the first magnetic member and the third magnetic member is a permanent magnet and the other is a magnetic body, and one of the second magnetic member and the fourth magnetic member is a permanent magnet and the other is a magnetic body. Thereby, heat occurring when using the electromagnet, and control noise occurring when using the actuator, can be prevented.

Another aspect of the present invention is the above-noted probe measuring force adjuster in which an attraction force acts on an area between the first magnetic member and the third magnetic member and an area between the second magnetic member and the fourth magnetic member. Accordingly, the magnetic force acts to cancel out the spring force. Therefore, it becomes possible to inhibit a magnitude of the force acting upon the second member and to decrease the magnitude of the force. As a result, the measuring force acting upon a measured object can be inhibited and decreased.

Another aspect of the present invention is the above-noted probe measuring force adjuster in which, a repulsive force acts on an area between the first magnetic member and the third magnetic member and an area between the second magnetic member and the fourth magnetic member. Accordingly, the magnetic force acts in the same direction as the spring force. Therefore, it becomes possible to increase the magnitude of the force acting upon the second member. As a result, the measuring force acting upon the measured object can be increased, thereby enhancing responsiveness of the measurement.

Another aspect of the present invention is the above-noted probe measuring force adjuster in which the first plate-like elastic member and the second plate-like elastic member are plate springs. Accordingly, it becomes possible to provide the spring force to the second member in the first direction.

Another aspect of the present invention is the above-noted probe measuring force adjuster in which the first plate-like elastic member and the second plate-like elastic member are folding hinges. Accordingly, it becomes possible to provide the spring force to the second member in the first direction.

Another aspect of the present invention is the above-noted probe measuring force adjuster that further includes a third member, and the first plate-like elastic member includes third and fourth flat plate-like elastic members and the second plate-like elastic member includes fifth and sixth flat plate-like elastic members. The third flat plate-like elastic member has a first end fixated to the first end portion of the second member and a principal surface facing the first direction. The fourth plate-like elastic member has a first end fixated to the first member, a second end having a fixed position with respect to the second end of the third flat plate-like elastic member, and a principal surface facing the first direction. The fifth flat plate-like elastic member has a first end fixated to the second end portion of the second member and a principal surface facing the first direction. The sixth plate-like elastic member has a first end fixated to the first member, a second end having a fixed position with respect to the second end of the fifth flat plate-like elastic member, and a principal surface facing the first direction. Accordingly, even when folding hinges are used, similar to when plate springs are used, the measuring force can be adjusted with a simple configuration.

Another aspect of the present invention is a probe measuring force adjuster that includes first and second measuring force adjusters that are the above-noted probe measuring force adjuster. The second measuring force adjuster is arranged to be rotated by 90 degrees around a rotation axis of a second direction perpendicular to the first direction with respect to the first measuring force adjuster. The second member of the first measuring force adjuster and the first member of the second measuring force adjuster are connected. Accordingly, the probe measuring force adjuster can be configured to detect displacement of two axes perpendicular to each other and also adjust the measuring force of the two axes.

Another aspect of the present invention is a probe measuring force adjuster that includes first through third measuring force adjusters that are the above-noted probe measuring force adjuster. The second measuring force adjuster is arranged to be rotated by 90 degrees around the rotation axis of the second direction perpendicular to the first direction with respect to the first measuring force adjuster. The third measuring force adjuster is arranged to be rotated by 90 degrees around the rotation axis of a third direction perpendicular to the first and second directions with respect to the first measuring force adjuster and to be rotated by 90 degrees around the rotation axis of the first direction with respect to the first measuring force adjuster. The second member of the first measuring force adjuster and the first member of the second measuring force adjuster are connected. The second member of the second measuring force adjuster and the first member of the third measuring force adjuster are connected. Accordingly, the probe measuring force adjuster can be configured to detect displacement of three axes mutually perpendicular to one another and also adjust the measuring force of the three axes.

Another aspect of the present invention is the above-noted probe measuring force adjuster where the third magnetic member is configured so that the magnetic force of the third magnetic member is switchable, and the fourth magnetic member is configured so that the magnetic force of the fourth magnetic member is switchable. Accordingly, it becomes possible to easily change responsiveness of the measurement.

According to the present invention, the measuring force of the contact probe can be adjusted by a simple configuration.

The present invention is clarified by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
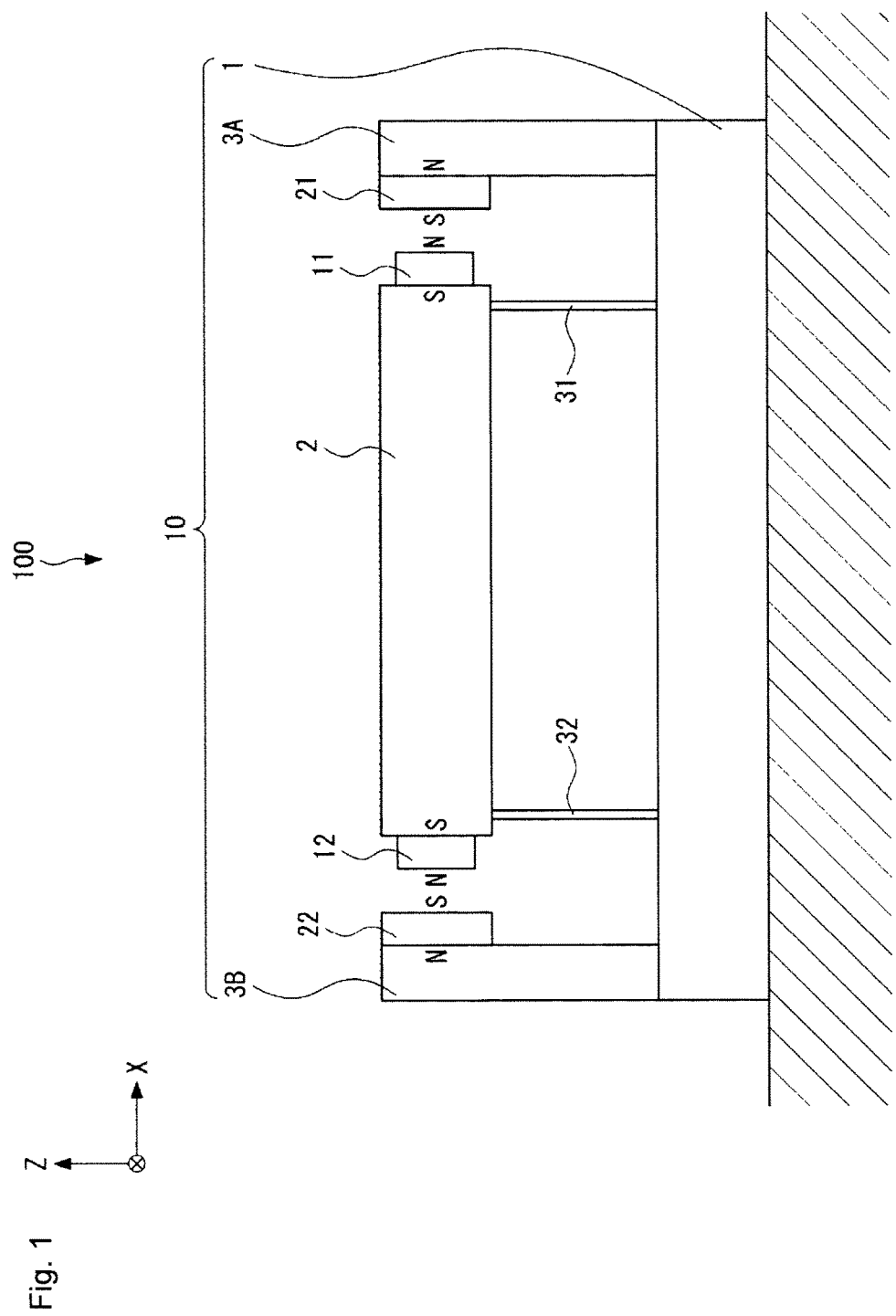
FIG. 1 is a front view schematically illustrating a configuration of a probe measuring force adjuster according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the drawings, and duplicative descriptions are omitted where necessary.

First Embodiment

Figure 2:
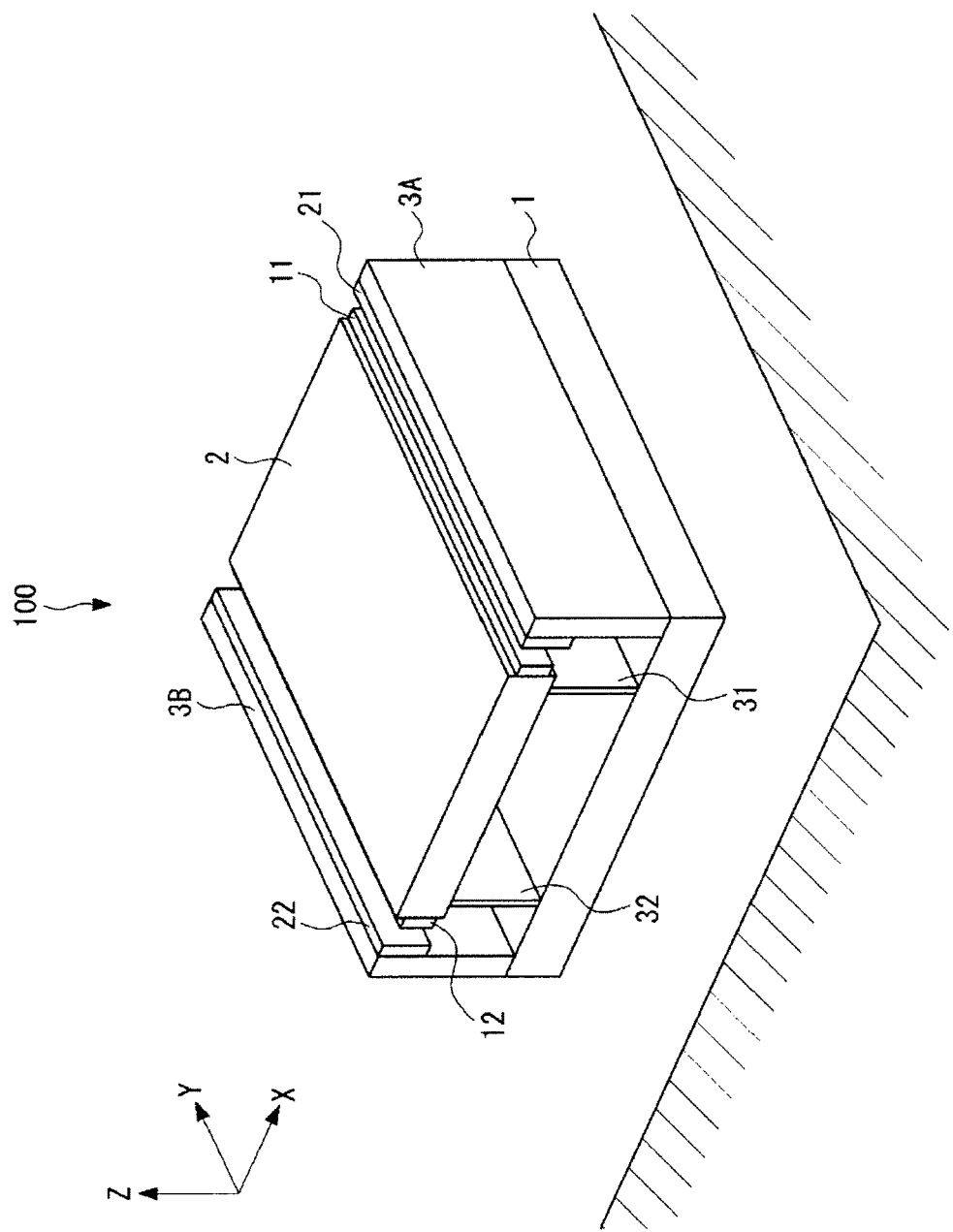
FIG. 2 is a perspective view schematically illustrating the configuration of the probe measuring force adjuster according to the first embodiment.

A description is given of a probe measuring force adjuster 100 according to a first embodiment. FIG. 1 is a front view schematically illustrating a configuration of the probe measuring force adjuster 100 according to the first embodiment. FIG. 2 is a perspective view schematically illustrating the configuration of the probe measuring force adjuster 100 according to the first embodiment. In FIG. 1, a left-to-right direction along a direction horizontal to a plane of the drawing sheet is indicated as an X direction, a depth direction from a front side of the paper to a back side of the paper along a direction perpendicular to the plane of the drawing sheet is indicated as a Y direction, and a bottom-to-top direction along a vertical direction of the plane of the drawing sheet is indicated as a Z direction. In other words, X, Y, and Z directions are mutually orthogonal directions. Moreover, a relationship between the X, Y, and Z directions is the same in the drawings referenced hereafter and in the following description. Additionally, the X direction is referred to as a first direction, the Y direction as a third direction, and the Z direction as a second direction.

The probe measuring force adjuster 100 has a base 1, a stylus support portion 2, a column 3A and a column 3B, permanent magnets 11 and 12, permanent magnets 21 and 22, and plate springs 31 and 32.

The stylus support portion 2 is also referred to as a second member. The permanent magnets 11 and 12 are also referred to as a first magnetic member and a second magnetic member, respectively. The permanent magnets 21 and 22 are also referred to as a third magnetic member and a fourth magnetic member, respectively. The plate springs 31 and 32 are also referred to as a first flat plate-like elastic member and a second flat plate-like elastic member, respectively. As used herein, a "spring" 31 and 32 is any elastic body or device that recovers its original shape when released after being distorted, and is not limited to a coil spring. Rather, the spring 31 and 32 is only an example of an elastic member or elastomer. In other words, different types of springs of any suitable material or configuration can be used.

The base 1 is a portion fixated to a measuring device (such as a coordinate measuring machine). In order to simplify the figure, details of the measuring device are not shown in FIGS. 1 and 2. The column 3A and the column 3B are arranged on the base 1 so as to be separated from each other in the X direction and projecting on the Z (+) side. It is noted that although the base 1 and the column 3A and the column 3B are separately described above, the base 1 and the column 3A and the column 3B can be understood as being integrally configured to be a fixed portion 10 that is fixated to a measuring device (such as a coordinate measuring machine). The fixed portion 10 is also referred to as a first member or frame.

The plate springs 31 and 32 are arranged in parallel on the base 1. That is, a principal surface of the plate spring 31 (X-Z plane, that is, a surface facing the X direction) and a principal surface of the plate spring 32 (X-Z plane) are in parallel to each other. Additionally, the plate springs 31 and 32 are arranged so that the principal surfaces of the plate springs 31 and 32 are perpendicular to a principal surface of the base 1 (X-Y plane, that is, a surface facing the X direction).

The stylus support portion 2 is arranged so as to face the base 1 via the plate springs 31 and 32. The stylus support portion 2 is supported by the plate springs 31 and 32 and is moveable in the X direction. In other words, an end portion on a Y (+) side of the plate spring 31 is fixated to an end portion on an X (+) side of the stylus support portion 2, and an end portion on a Y (−) side of the plate spring 31 is fixated to the base 1. An end portion on the Y (+) side of the plate spring 32 is fixated to an end portion on an X (−) side of the stylus support portion 2, and an end portion on the Y (−) side of the plate spring 32 is fixated to the base 1. The stylus support portion 2 is arranged so as to be held between the column 3A and the column 3B. The permanent magnet 11 is provided to the end portion on the X (+) side of the stylus support portion 2, and the permanent magnet 12 is provided to the end portion on the X (−) side of the stylus support portion 2.

The permanent magnet 21 is arranged on the column 3A so as to face the permanent magnet 11. In this state, the permanent magnet 11 and the permanent magnet 21 are provided to have mutually different magnetic poles so that an attraction force acts on an area therebetween. In the present embodiment, an X (+) side surface of the permanent magnet 11 is the north pole, and an X (−) side surface of the permanent magnet 11 is the south pole. An X (+) side surface of the permanent magnet 21 is the north pole, and an X (−) side surface of the permanent magnet 21 is the south pole.

The permanent magnet 22 is arranged on the column 3B so as to face the permanent magnet 12. In this state, the permanent magnet 12 and the permanent magnet 22 are provided to have mutually different magnetic poles so that an attraction force acts on the area therebetween. In the present embodiment, an X (+) side surface of the permanent magnet 12 is the south pole, and an X (−) side surface of the permanent magnet 12 is the north pole. An X (+) side surface of the permanent magnet 22 is the south pole, and an X (−) side surface of the permanent magnet 22 is the north pole.

Figure 3:
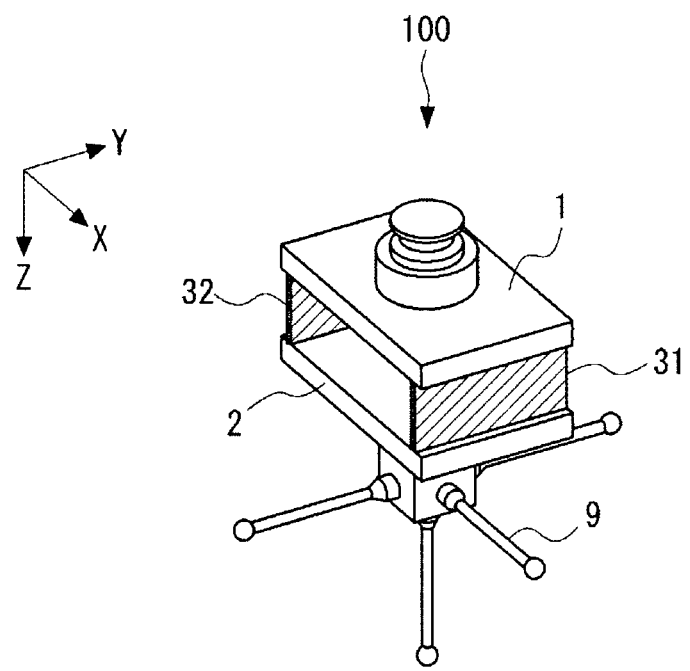
FIG. 3 is a perspective view illustrating an exemplary attachment of a stylus to the probe measuring force adjuster according to the first embodiment.

In the probe measuring force adjuster 100, a stylus 9 having probes that make contact with a measured object provided thereto is attached to the stylus support portion 2. FIG. 3 is a perspective view illustrating an exemplary attachment of a stylus to the probe measuring force adjuster 100 according to the first embodiment. In order to simplify the figure, the column 3A and the column 3B and permanent magnets 11, 12, 21, and 22 are not shown in FIG. 3. In addition, the plate springs 31 and 32 are hatched so that the positions thereof are more easily understood. The stylus 9 is attached to the stylus support portion 2 so as to project on the Z (+) side.

Figure 4:
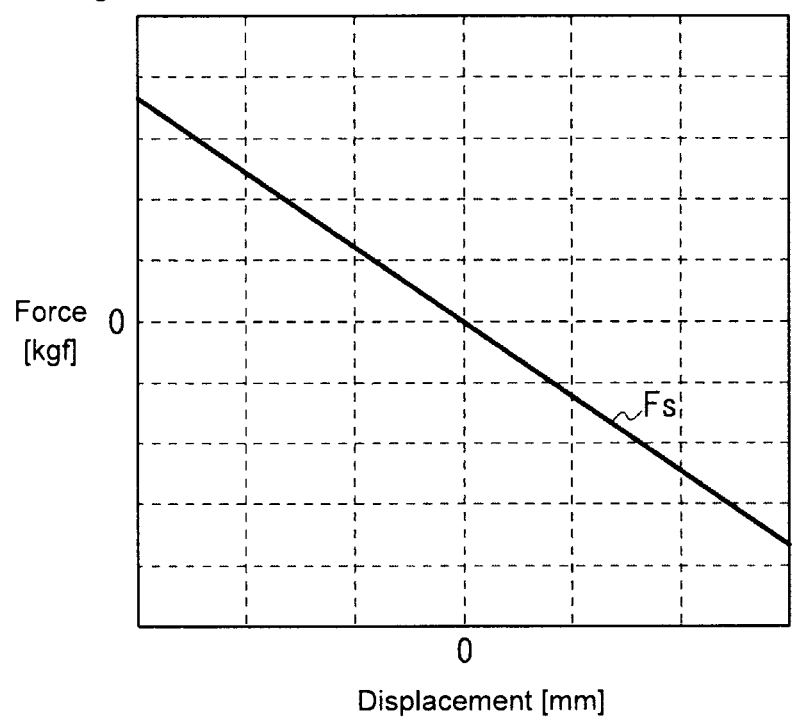
FIG. 4 is a graph illustrating a spring force which acts upon the probe measuring force adjuster according to the first embodiment.

Operation of the probe measuring force adjuster 100 is described. In the probe measuring force adjuster 100, when a force in the X (+) direction is applied to the stylus 9, each of the plate springs 31 and 32 deforms with a fixed portion on the base 1 side thereof being a fixed end, and the stylus support portion 2 is displaced in the X (+) direction. When a force in the X (−) direction is applied to the stylus 9, each of the plate springs 31 and 32 deforms with the fixed portion on the base 1 side thereof being the fixed end, and the stylus support portion 2 is displaced in the X (−) direction. In this state, a spring force generated by the plate springs 31 and 32 is applied to the stylus support portion 2 in response to the displacement of the stylus support portion 2 in the X direction. FIG. 4 is a graph illustrating a spring force which acts upon the probe measuring force adjuster according to the first embodiment. As illustrated in FIG. 4, a spring force Fs is expressed as a product of a spring constant of the plate springs 31 and 32 and the displacement in the X direction of the stylus support portion 2, and changes linearly according to the displacement in the X direction of the stylus support portion 2.

Figure 5:
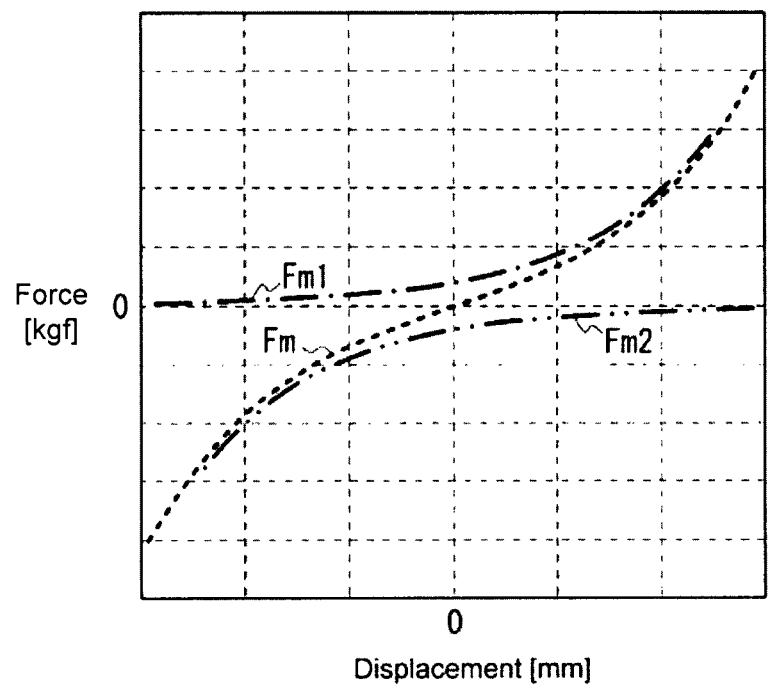
FIG. 5 is a graph illustrating a magnetic force which acts upon the probe measuring force adjuster according to the first embodiment.

In addition, the attraction force generated by the magnetic force of the permanent magnets (permanent magnets 11, 12, 21, and 22) acts on areas between the stylus support portion 2 and the columns 3A and 3B. FIG. 5 is a graph illustrating a magnetic force which acts upon the probe measuring force adjuster according to the first embodiment. When the stylus support portion 2 is displaced in the X (+) direction, the permanent magnet 11 and the permanent magnet 21 approach each other, which causes an attraction force Fm1 between them to become stronger. At the same time, since the permanent magnet 12 and the permanent magnet 22 move away from each other, an attraction force Fm2 between them becomes weaker. As a result, the magnetic force Fm in the X (+) direction materially acts upon the stylus support portion 2. On the other hand, when the stylus support portion 2 is displaced in the X (−) direction, the permanent magnet 11 and the permanent magnet 21 move away from each other, which causes the attraction force Fm1 between them to become weaker. At the same time, since the permanent magnet 12 and the permanent magnet 22 approach each other, the attraction force Fm2 between them becomes stronger. As a result, the magnetic force Fm in the X (−) direction materially acts upon the stylus support portion 2.

Figure 6:
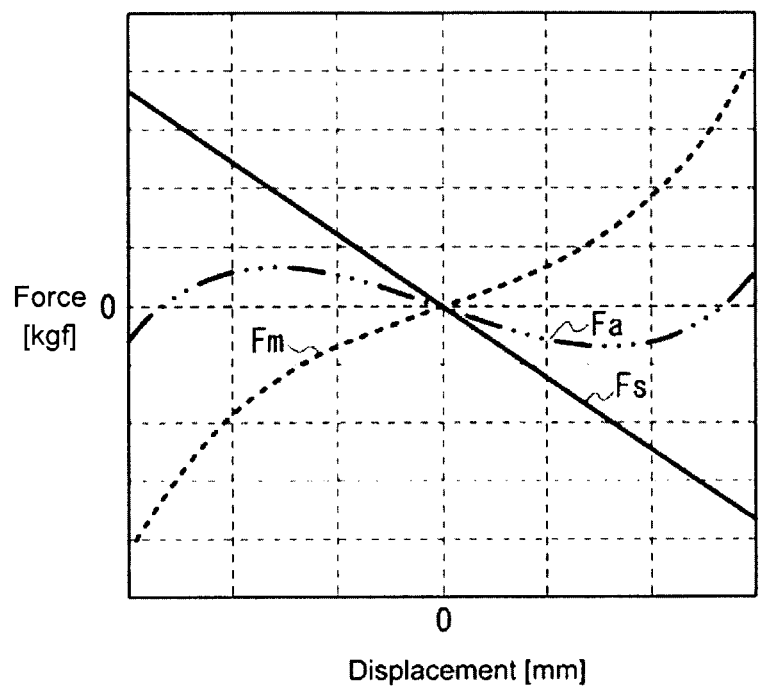
FIG. 6 is a graph illustrating a resultant force of a spring force and the magnetic force which acts upon the probe measuring force adjuster according to the first embodiment.

Given the above, when the stylus support portion 2 is displaced in the X (+) direction, the spring force in the X (−) direction and the magnetic force in the X (+) direction act upon the stylus support portion 2. When the stylus support portion 2 is displaced in the X (−) direction, the spring force in the X (+) direction and the magnetic force in the X (−) direction act upon the stylus support portion 2. FIG. 6 is a graph illustrating a resultant force of the spring force and the magnetic force which acts upon the probe measuring force adjuster 100 according to the first embodiment. As illustrated in FIG. 6, in the probe measuring force adjuster 100, it can be understood that the magnetic force acts upon the stylus support portion 2 so as to cancel out the spring force. Therefore, it becomes possible to inhibit a magnitude of a force Fa materially acting upon the stylus support portion 2 and to equalize the magnitude of the force. As a result, the measuring force acting upon the measured object can be inhibited and equalized.

As described above, the probe measuring force adjuster 100 adjusts the measuring force with a simple configuration combining a flat plate-like elastic member (plate spring) and the permanent magnet. In other words, there is no need to introduce a configuration performing active control, such as an actuator, in order to adjust the measuring force. Accordingly, highly accurate measurement can be performed since heat and noise generated in association with the control can be prevented.

Figure 7:
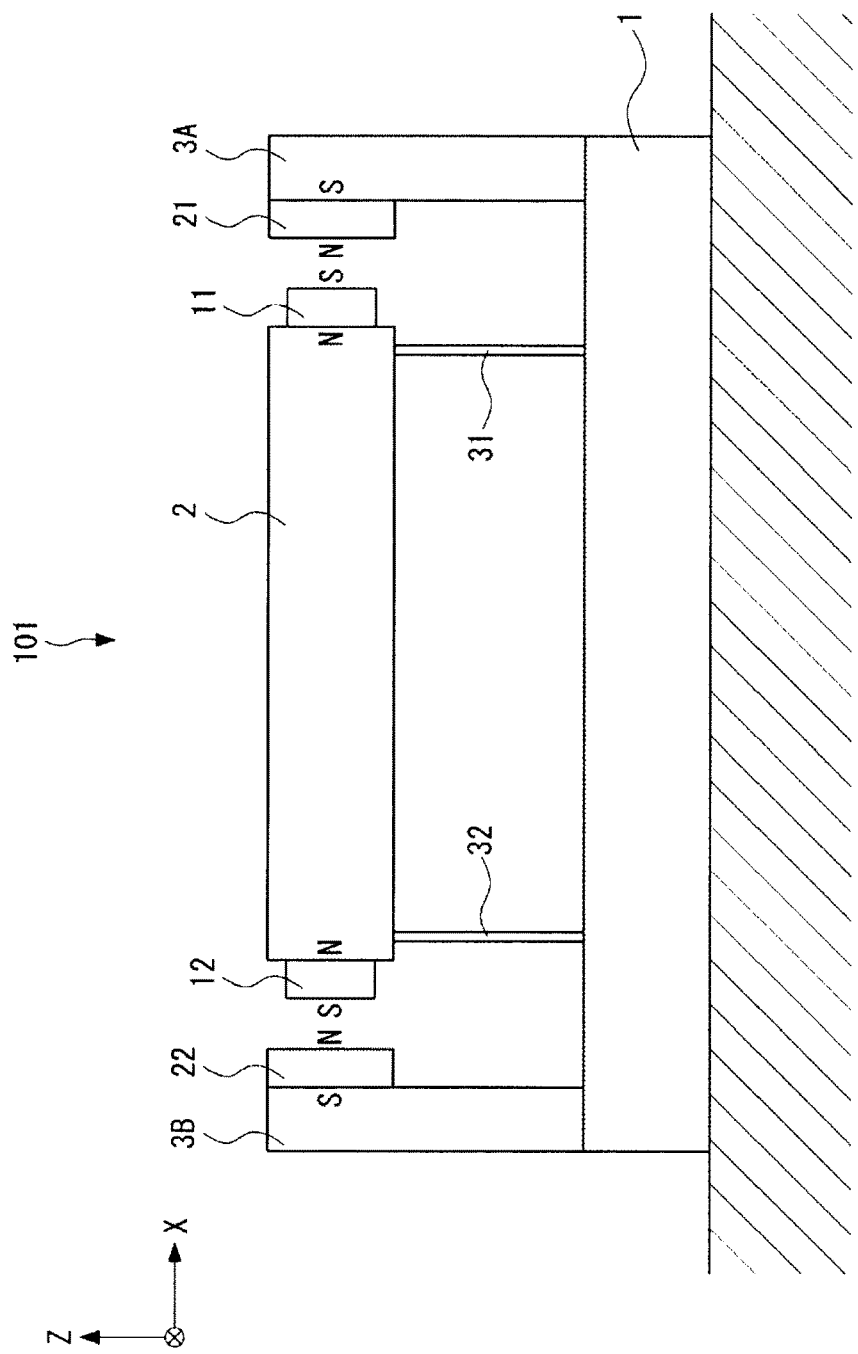
FIG. 7 is a front view illustrating a modification of the probe measuring force adjuster according to the first embodiment.

In addition, the polarity of the permanent magnets 11, 12, 21 and 22 mentioned above is merely exemplary. For example, magnetic poles of each of the permanent magnets 11, 12, 21 and 22 may be swapped. FIG. 7 is a front view illustrating a probe measuring force adjuster 101, which is a modification of the probe measuring force adjuster 100 according to the first embodiment. As illustrated in FIG. 7, in the present embodiment, the X (+) side surface of the permanent magnet 11 is the south pole, and the X (−) side surface of the permanent magnet 11 is the north pole. The X (+) side surface of the permanent magnet 21 is the south pole, and the X (−) side surface of the permanent magnet 21 is the north pole. The X (+) side surface of the permanent magnet 12 is the north pole, and the X (−) side surface of the permanent magnet 12 is the south pole. The X (+) side surface of the permanent magnet 22 is the north pole, and the X (−) side surface of the permanent magnet 22 is the south pole.

Figure 8:
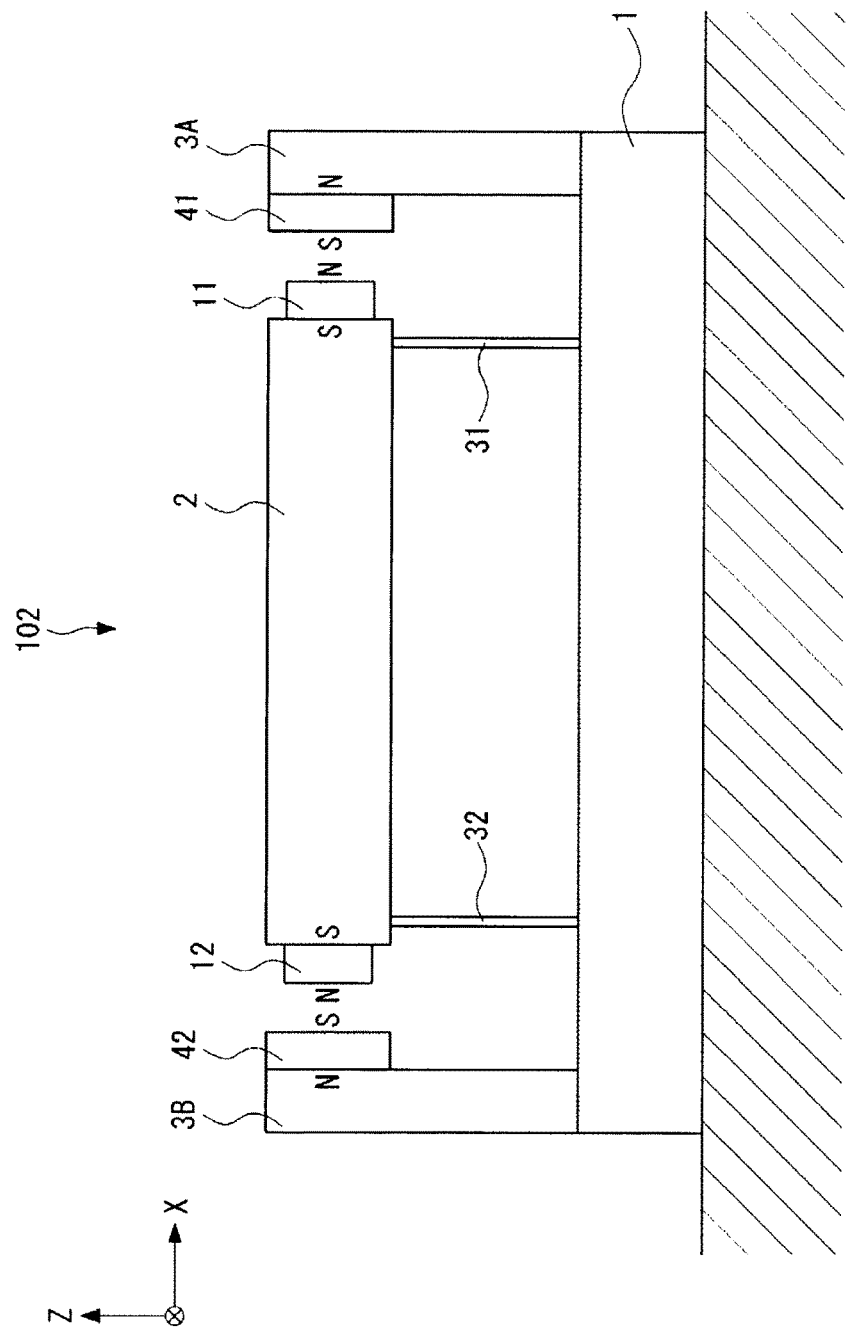
FIG. 8 is a front view illustrating another modification of the probe measuring force adjuster according to the first embodiment.

Further, one of the permanent magnets 11 and 12 may be replaced by a member composed of magnetic material, and one of the permanent magnets 12 and 22 may be replaced by a member composed of magnetic material. FIG. 8 is a front view illustrating a probe measuring force adjuster 102, which is another modification of the probe measuring force adjuster 100 according to the first embodiment. As illustrated in FIG. 8, in the present embodiment, the permanent magnets 21 and 22 are replaced by magnetic bodies 41 and 42, respectively. Since the X (+) side surface of the permanent magnet 11 is the north pole and the X (−) side surface of the permanent magnet 11 is the south pole, an X (+) side surface of the magnetic body 41 is the north pole, and an X (−) side surface of the magnetic body 41 is the south pole. Since the X (+) side surface of the permanent magnet 12 is the south pole and the X (−) side surface of the permanent magnet 12 is the north pole, an X (+) side surface of the magnetic body 42 is the south pole, and an X (−) side surface of the magnetic body 42 is the north pole. It can be understood from the above that an operation and an effect similar to those of the probe measuring force adjuster 100 are achieved even when one of the mutually opposing permanent magnets is replaced by the magnetic body. When replacing one of the opposing permanent magnets with the magnetic body, the permanent magnet on either side may be replaced by the magnetic body, and the magnetic poles of the permanent magnet may be swapped. Further, a portion of the stylus support portion 2 and the columns 3A and 3B may be used as the magnetic body.

In the present embodiment and the embodiments hereafter, a permanent magnet and a member composed of magnetic material (magnetic body) shall also be referred to as a magnetic member.

Second Embodiment

Figure 9:
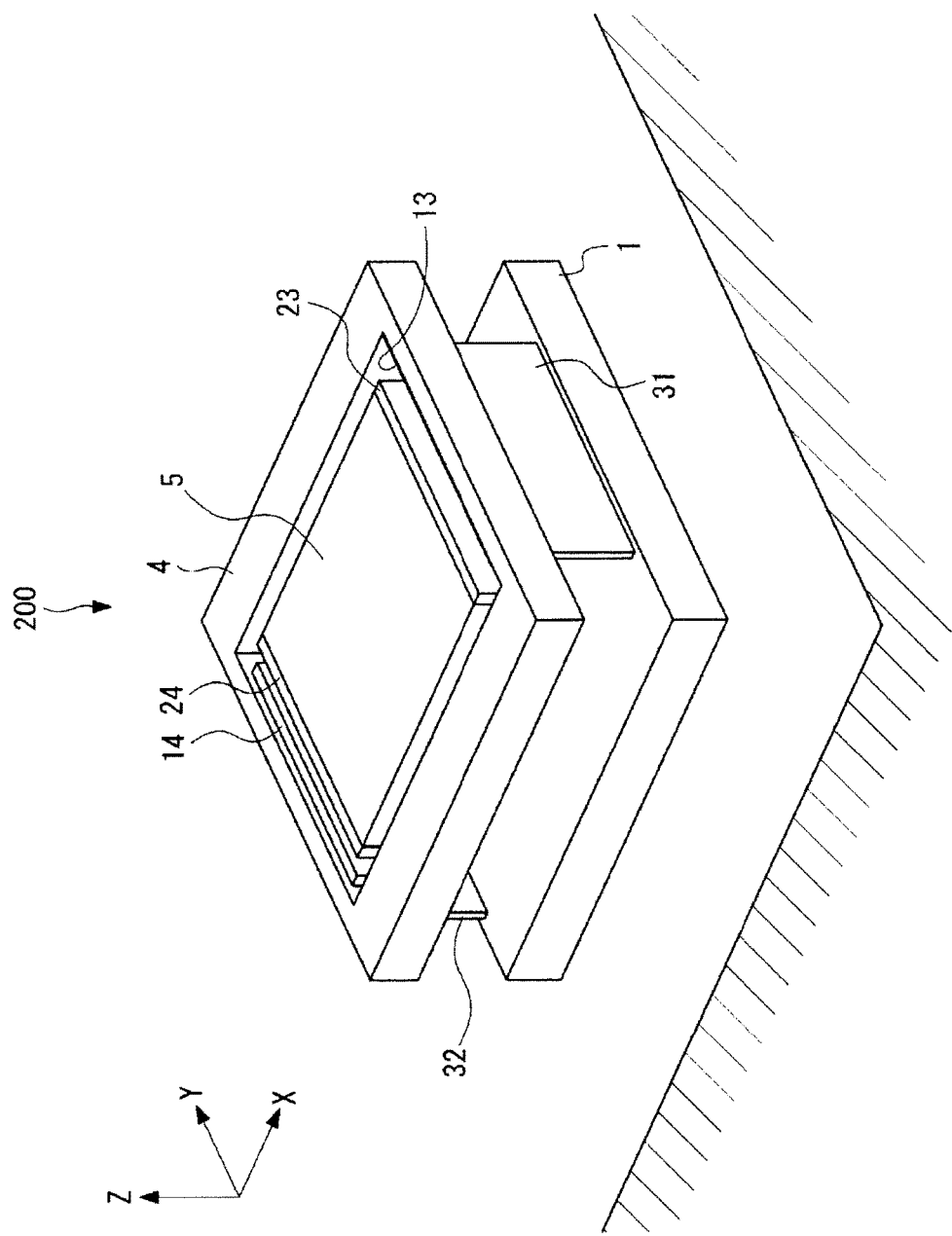
FIG. 9 is a perspective view schematically illustrating a configuration of a probe measuring force adjuster according to a second embodiment.
Figure 10:
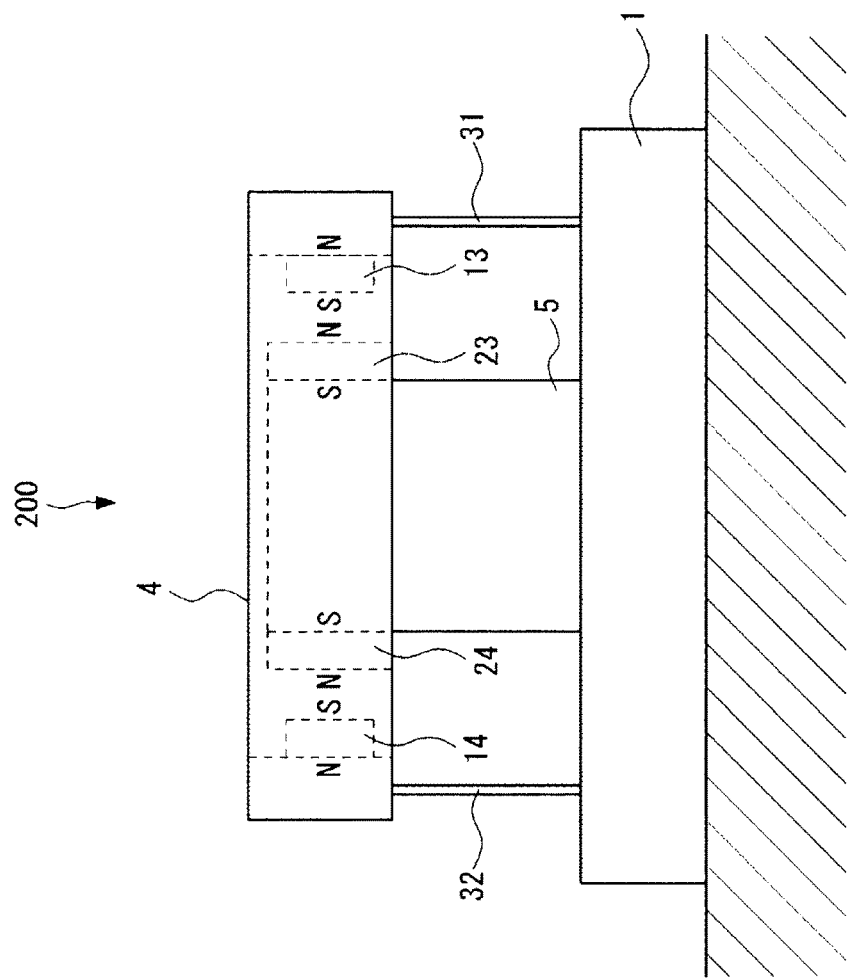
FIG. 10 is a front view schematically illustrating the configuration of the probe measuring force adjuster according to the second embodiment.

A description is given of a probe measuring force adjuster 200 according to a second embodiment. FIG. 9 is a perspective view schematically illustrating a configuration of the probe measuring force adjuster 200 according to the second embodiment. FIG. 10 is a front view schematically illustrating the configuration of the probe measuring force adjuster 200 according to the second embodiment. The probe measuring force adjuster 200 has the base 1, a stylus support portion 4, a column 5, permanent magnets 13 and 14, permanent magnets 23 and 24, and the plate springs 31 and 32.

The permanent magnets 13 and 14 correspond to the first magnetic member and the second magnetic member, respectively. The permanent magnets 23 and 24 correspond to the third magnetic member and the fourth magnetic member, respectively. The stylus support portion 4 corresponds to the second member. The base 1 and the column 5 form a single fixed portion, which fixed portion corresponds to the first member.

Since the base 1 is similar to that of the first embodiment, description thereof is omitted. The column 5 is arranged on the base 1 so as to project on the Z (+) side.

Similarly to the first embodiment, the plate springs 31 and 32 are arranged in parallel on the base 1. That is, the principal surface of the plate spring 31 (X-Z plane) and the principal surface of the plate spring 32 (X-Z plane) are in parallel to each other. Additionally, the plate springs 31 and 32 are arranged so that the principal surfaces of the plate springs 31 and 32 are perpendicular to the principal surface of the base 1 (X-Y plane).

The stylus support portion 4 is arranged so as to face the base 1 via the plate springs 31 and 32. However, the stylus support portion 4 is provided so as to cover the column 5, and each of the plate springs 31 and 32 is joined to an end portion in the X direction of the stylus support portion 4. In other words, the plate springs 31 and 32 are arranged so as to face each other via the column 5.

The permanent magnet 23 is arranged on an X (+) side surface on an upper portion of the column 5, and the permanent magnet 24 is arranged on an X (−) side surface on the upper portion of the column 5. In addition, on the stylus support portion 4, the permanent magnet 13 is arranged at a position facing the permanent magnet 23 and the permanent magnet 14 is arranged at a position facing the permanent magnet 24. In this state, the permanent magnet 13 and the permanent magnet 23 are provided to have mutually different magnetic poles so that an attraction force acts on an area therebetween. In the present embodiment, an X (+) side surface of the permanent magnet 13 is the north pole, and an X (−) side surface of the permanent magnet 13 is the south pole. An X (+) side surface of the permanent magnet 23 is the north pole, and an X (−) side surface of the permanent magnet 23 is the south pole. The permanent magnet 14 and the permanent magnet 24 are provided to have mutually different magnetic poles so that an attraction force acts on an area therebetween. In the present embodiment, an X (+) side surface of the permanent magnet 14 is the south pole, and an X (−) side surface of the permanent magnet 14 is the north pole. An X (+) side surface of the permanent magnet 24 is the south pole, and an X (−) side surface of the permanent magnet 24 is the north pole.

Given the above, in the probe measuring force adjuster 200, when the stylus support portion 4 is displaced in the X (+) direction, the spring force in the X (−) direction and the magnetic force in the X (+) direction act upon the stylus support portion 4. When the stylus support portion 4 is displaced in the X (−) direction, the spring force in the X (+) direction and the magnetic force in the X (−) direction act upon the stylus support portion 4. Accordingly, similar to the probe measuring force adjuster 100 according to the first embodiment, the magnetic force acts to cancel out the spring force. Therefore, it becomes possible to inhibit the magnitude of the force materially acting upon the stylus support portion 4 and to equalize the magnitude of the force. As a result, similar to the first embodiment, the measuring force acting upon the measured object can be inhibited and equalized.

Third Embodiment

Figure 11:
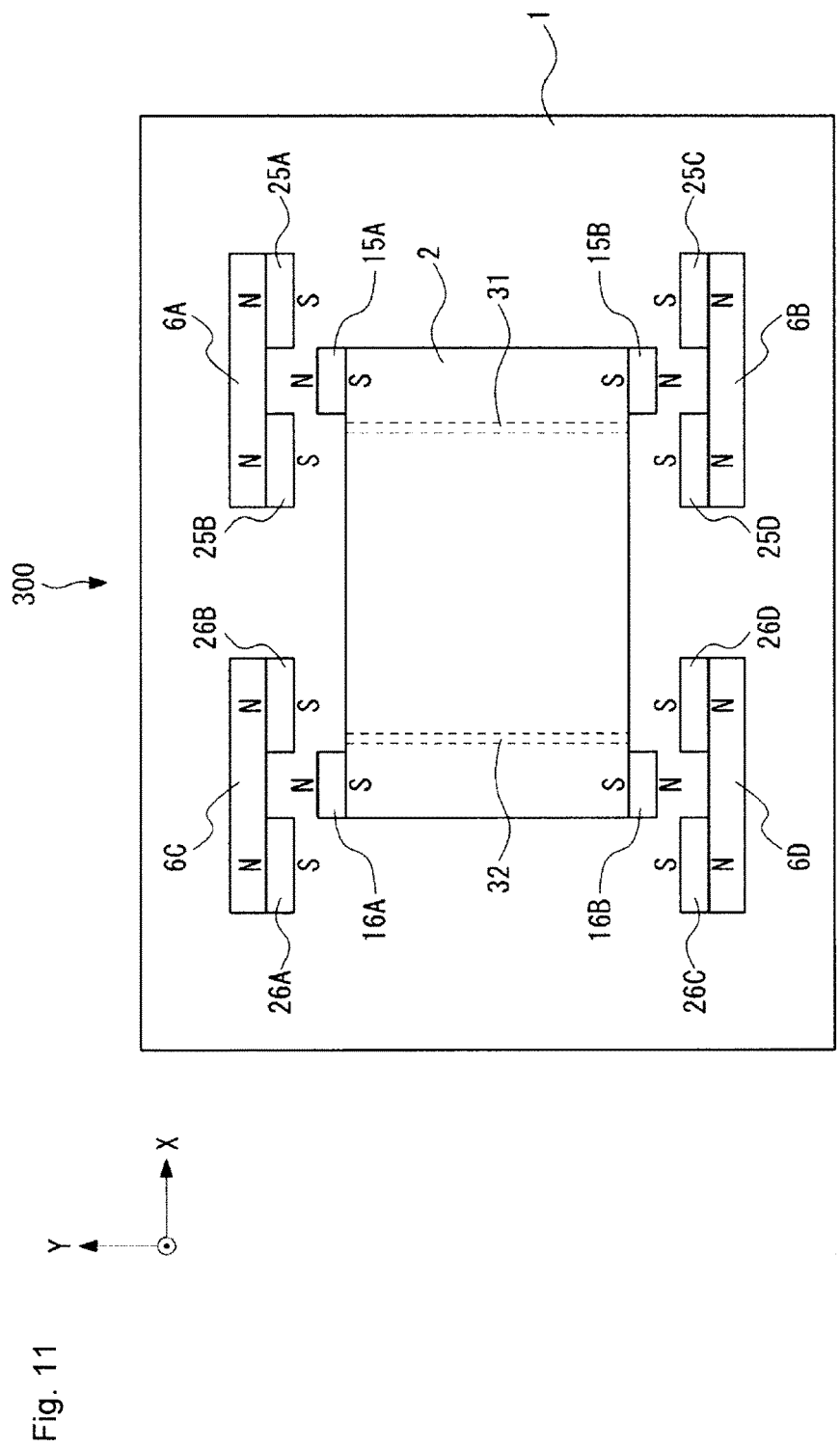
FIG. 11 is a top view schematically illustrating a configuration of a probe measuring force adjuster according to a third embodiment.

A description is given of a probe measuring force adjuster 300 according to a third embodiment. FIG. 11 is a top view schematically illustrating the configuration of the probe measuring force adjuster 300 according to the third embodiment. The probe measuring force adjuster 300 has the base 1, the stylus support portion 2, columns 6A through 6D, permanent magnets 15A, 15B, 16A and 16B, permanent magnets 25A through 25D, permanent magnets 26A through 26D, and the plate springs 31 and 32.

Since the base 1 is similar to that of the first embodiment, description thereof is omitted. Each of the columns 6A through 6D is arranged on the base 1 so as to be on an outer side of one of the four corners of the stylus support portion 2, and projecting on the Z (+) side.

The permanent magnets 15A and 15B correspond to the first magnetic member. The permanent magnets 16A and 16B correspond to the second magnetic member. The permanent magnets 25A through 25D correspond to the third magnetic member. The permanent magnets 26A through 26D correspond to the fourth magnetic member. The base 1 and the columns 6A through 6D form a single fixed portion, which fixed portion corresponds to the first member.

Since arrangement of the plate springs 31 and 32 is similar to that in the probe measuring force adjuster 100 according to the first embodiment, description thereof is omitted.

The permanent magnet 15A is arranged on an X (+) side end portion of a Y (+) side surface of the stylus support portion 2. The permanent magnet 15B is arranged on an X (+) side end portion of a Y (−) side surface of the stylus support portion 2. The permanent magnet 16A is arranged on an X (−) side end portion of the Y (+) side surface of the stylus support portion 2. The permanent magnet 16B is arranged on an X (−) side end portion of the Y (−) side surface of the stylus support portion 2.

On a Y (−) side surface of the column 6A, the permanent magnet 25A and the permanent magnet 25B are arranged so as to be separated from each other in the X direction and an attraction force generated by magnetic force acts upon the permanent magnet 15A. In the present embodiment, a Y (+) side surface of the permanent magnet 15A is the north pole, and a Y (−) side surface of the permanent magnet 15A is the south pole. A Y (+) side surface of the permanent magnet 25A is the north pole, and a Y (−) side surface of the permanent magnet 25A is the south pole. A Y (+) side surface of the permanent magnet 25B is the north pole, and a Y (−) side surface of the permanent magnet 25B is the south pole.

On a Y (+) side surface of the column 6B, the permanent magnet 25C and the permanent magnet 25D are arranged so as to be separated from each other in the X direction and an attraction force generated by magnetic force acts upon the permanent magnet 15B. In the present embodiment, a Y (+) side surface of the permanent magnet 15B is the south pole, and a Y (−) side surface of the permanent magnet 15B is the north pole. A Y (+) side surface of the permanent magnet 25C is the south pole, and a Y (−) side surface of the permanent magnet 25C is the north pole. A Y (+) side surface of the permanent magnet 25D is the south pole, and a Y (−) side surface of the permanent magnet 25D is the north pole.

On a Y (−) side surface of the column 6C, the permanent magnet 26A and the permanent magnet 26B are arranged so as to be separated from each other in the X direction and an attraction force generated by magnetic force acts upon the permanent magnet 16A. In the present embodiment, a Y (+) side surface of the permanent magnet 16A is the north pole, and a Y (−) side surface of the permanent magnet 16A is the south pole. A Y (+) side surface of the permanent magnet 26A is the north pole, and a Y (−) side surface of the permanent magnet 26A is the south pole. A Y (+) side surface of the permanent magnet 26B is the north pole, and a Y (−) side surface of the permanent magnet 26B is the south pole.

On a Y (+) side surface of the column 6D, the permanent magnet 26C and the permanent magnet 26D are arranged so as to be separated from each other in the X direction and an attraction force generated by magnetic force acts upon the permanent magnet 16B. In the present embodiment, a Y (+) side surface of the permanent magnet 16B is the south pole, and a Y (−) side of the permanent magnet 16B is the north pole. A Y (+) side surface of the permanent magnet 26C is the south pole, and a Y (−) side surface of the permanent magnet 26C is the north pole. A Y (+) side surface of the permanent magnet 26D is the south pole, and a Y (−) side surface of the permanent magnet 26D is the north pole.

In the probe measuring force adjuster 300, similar to the probe measuring force adjuster 100, the stylus 9 (not shown in the drawings) having probes that make contact with the measured object provided thereto is attached to the stylus support portion 2 so as to project on the Z (+) side. Similar to the probe measuring force adjuster 100, when the force in the X (+) direction is applied to the stylus 9, the stylus support portion 2 is displaced in the X (+) direction, and when the force in the X (−) direction is applied to the stylus 9, the stylus support portion 2 is displaced in the X (−) direction. In this state, the spring force generated by the plate springs 31 and 32 is applied to the stylus support portion 2 in response to the displacement of the stylus support portion 2 in the X direction, similar to the probe measuring force adjuster 100.

In addition, the attraction force generated by the magnetic force of the permanent magnets (permanent magnets 15A, 15B, 16A, 16B; 25A through 25D; and 26A through 26D) acts on areas between the stylus support portion 2 and the columns 6A, 6B, 6C and 6D.

When the stylus support portion 2 is displaced in the X (+) direction, an area of a portion where the permanent magnet 15A and the permanent magnet 25A overlap each other becomes larger, which causes the attraction force between them to become stronger. Since an area of a portion where the permanent magnet 15A and the permanent magnet 25B overlap each other becomes smaller, the attraction force between them becomes weaker. Since an area of a portion where the permanent magnet 15B and the permanent magnet 25C overlap each other becomes larger, the attraction force between them becomes stronger. Since an area of a portion where the permanent magnet 15B and the permanent magnet 25D overlap each other becomes smaller, the attraction force between them becomes weaker. Since an area of a portion where the permanent magnet 16A and the permanent magnet 26B overlap each other becomes larger, the attraction force between them becomes stronger. Since an area of a portion where the permanent magnet 16A and the permanent magnet 26A overlap each other becomes smaller, the attraction force between them becomes weaker. Since an area of a portion where the permanent magnet 16B and the permanent magnet 26D overlap each other becomes larger, the attraction force between them becomes stronger. Since an area of a portion where the permanent magnet 16B and the permanent magnet 26C overlap each other becomes smaller, the attraction force between them becomes weaker. As a result, the magnetic force in the X (+) direction materially acts upon the stylus support portion 2.

On the other hand, when the stylus support portion 2 is displaced in the X (−) direction, the area of the portion where the permanent magnet 15A and the permanent magnet 25A overlap each other becomes smaller, which causes the attraction force between them to become weaker. Since the area of the portion where the permanent magnet 15A and the permanent magnet 25B overlap each other becomes larger, the attraction force between them becomes stronger. Since the area of the portion where the permanent magnet 15B and the permanent magnet 25C overlap each other becomes smaller, the attraction force between them becomes weaker. Since the area of the portion where the permanent magnet 15B and the permanent magnet 25D overlap each other becomes larger, the attraction force between them becomes stronger. Since the area of the portion where the permanent magnet 16A and the permanent magnet 26B overlap each other becomes smaller, the attraction force between them becomes weaker. Since the area of the portion where the permanent magnet 16A and the permanent magnet 26A overlap each other becomes larger, the attraction force between them becomes stronger. Since the area of the portion where the permanent magnet 16B and the permanent magnet 26D overlap each other becomes smaller, the attraction force between them becomes weaker. Since the area of the portion where the permanent magnet 16B and the permanent magnet 26C overlap each other becomes larger, the attraction force between them becomes stronger. As a result, the magnetic force in the X (−) direction materially acts upon the stylus support portion 2.

Given the above, when the stylus support portion 2 is displaced in the X (+) direction, the spring force in the X (−) direction and the magnetic force in the X (+) direction act upon the stylus support portion 2. When the stylus support portion 2 is displaced in the X (−) direction, the spring force in the X (+) direction and the magnetic force in the X (−) direction act upon the stylus support portion 2. Accordingly, in the probe measuring force adjuster 300, it can be understood that the magnetic force acts upon the stylus support portion 2 so as to cancel out the spring force. Therefore, according to the probe measuring force adjuster 300, similar to the probe measuring force adjuster 100, it becomes possible to inhibit the magnitude of the force materially acting upon the stylus support portion 2 and to equalize the magnitude of the force. As a result, the measuring force acting upon the measured object can be inhibited and equalized.

Fourth Embodiment

Figure 12:
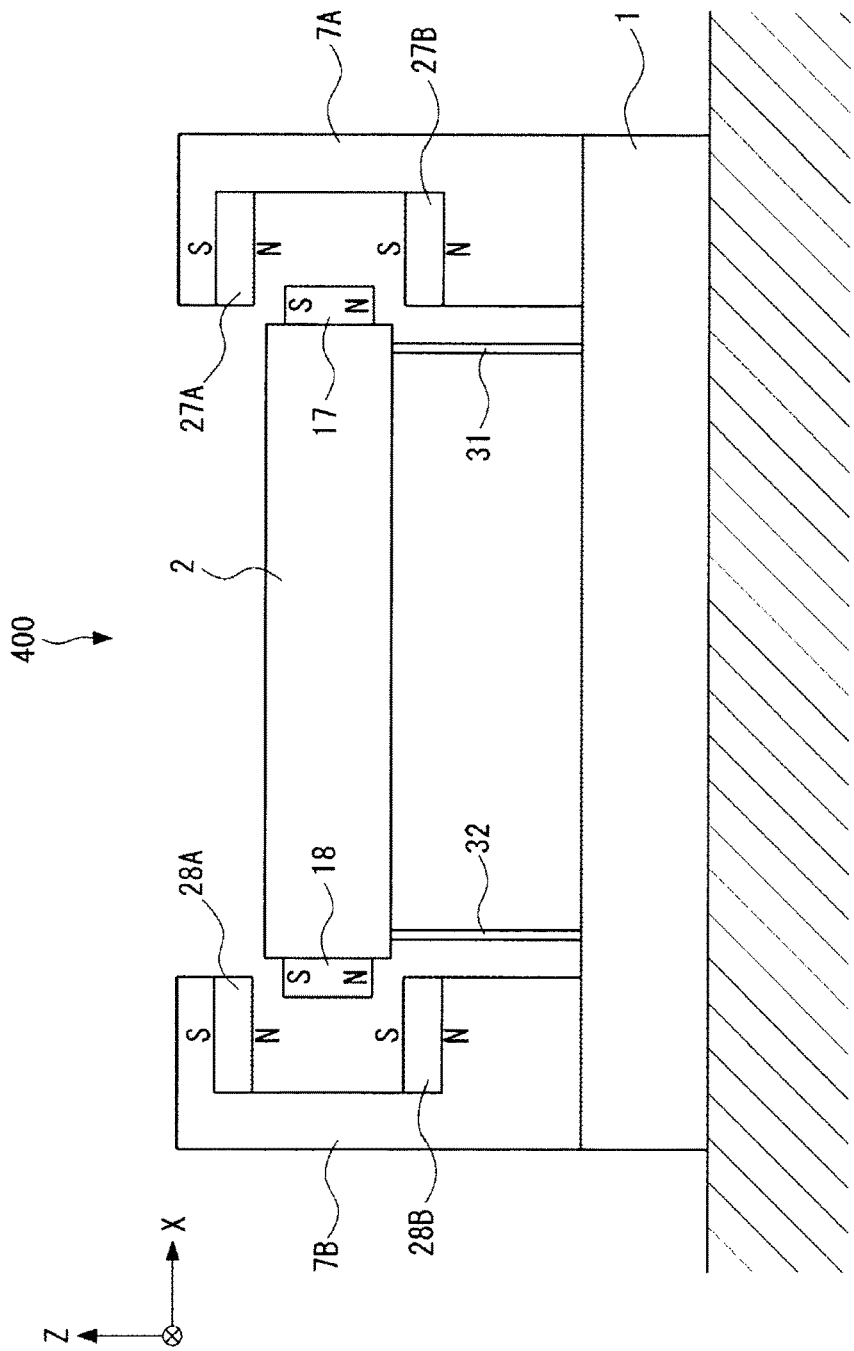
FIG. 12 is a front view schematically illustrating a configuration of a probe measuring force adjuster according to a fourth embodiment.

A description is given of a probe measuring force adjuster 400 according to a fourth embodiment. FIG. 12 is a front view schematically illustrating a configuration of the probe measuring force adjuster 400 according to the fourth embodiment. The probe measuring force adjuster 400 has the base 1, the stylus support portion 2, a column 7A and a column 7B, permanent magnets 17 and 18, permanent magnets 27A and 27B, permanent magnets 28A and 28B, and the plate springs 31 and 32.

Since the base 1, the stylus support portion 2, and the plate springs 31 and 32 are similar to that of the first embodiment, description thereof is omitted.

The permanent magnet 17 corresponds to the first magnetic member. The permanent magnet 18 corresponds to the second magnetic member. The permanent magnets 27A and 27B correspond to the third magnetic member. The permanent magnets 28A and 28B correspond to the fourth magnetic member. The base 1 and the columns 7A and 7B form a single fixed portion, which fixed portion corresponds to the first member.

The column 7A and the column 7B are arranged on the base 1 so as to be separated from each other in the X direction and projecting on the Z (+) side.

The permanent magnet 17 is provided to the end portion on the X (+) side of the stylus support portion 2, and the permanent magnet 18 is provided to the end portion on the X (−) side of the stylus support portion 2.

The permanent magnet 27A is arranged above the permanent magnet 17 on a Y (+) side surface of the column 7A, and the permanent magnet 27B is arranged below the permanent magnet 17 on a Y (−) side surface of the column 7A. The permanent magnet 17 and the permanent magnet 27A are arranged so that an attraction force acts on an area therebetween. The permanent magnet 17 and the permanent magnet 27B are arranged so that an attraction force acts on an area therebetween. In the present embodiment, a Y (+) side surface of the permanent magnet 17 is the south pole, and a Y (−) side surface of the permanent magnet 17 is the north pole. A Y (+) side surface of the permanent magnet 27A is the south pole, and a Y (−) side surface of the permanent magnet 27A is the north pole. A Y (+) side surface of the permanent magnet 27B is the south pole, and a Y (−) side surface of the permanent magnet 27B is the north pole.

The permanent magnet 28A is arranged above the permanent magnet 18 on a Y (+) side surface of the column 7B, and the permanent magnet 28B is arranged below the permanent magnet 18 on a Y (−) side surface of the column 7B. In this state, the permanent magnet 18 and the permanent magnet 28A are arranged so that an attraction force acts on an area therebetween. The permanent magnet 18 and the permanent magnet 28B are arranged so that an attraction force acts on an area therebetween. In the present embodiment, a Y (+) side surface of the permanent magnet 18 is the south pole, and a Y (−) side surface of the permanent magnet 18 is the north pole. A Y (+) side surface of the permanent magnet 28A is the south pole, and a Y (−) side surface of the permanent magnet 28A is the north pole. A Y (+) side surface of the permanent magnet 28B is the south pole, and a Y (−) side surface of the permanent magnet 28B is the north pole.

In the probe measuring force adjuster 400, similar to the probe measuring force adjuster 100, the stylus 9 (not shown in the drawings) having probes that make contact with the measured object provided thereto is attached to the stylus support portion 2 so as to project on the Z (+) side. Similar to the probe measuring force adjuster 100, when the force in the X (+) direction is applied to the stylus 9, the stylus support portion 2 is displaced in the X (+) direction, and when the force in the X (−) direction is applied to the stylus 9, the stylus support portion 2 is displaced in the X (−) direction. In this state, the spring force generated by the plate springs 31 and 32 is applied to the stylus support portion 2 in response to the displacement of the stylus support portion 2 in the X direction, similar to the probe measuring force adjuster 100.

In addition, the attraction force generated by the magnetic force of the permanent magnets (permanent magnets 17, 18, 27A, 27B, 28A and 28B) acts on areas between the stylus support portion 2 and the columns 7A and 7B.

When the stylus support portion 2 is displaced in the X (+) direction, an area of a portion where the south pole of the permanent magnet 17 and the north pole of the permanent magnet 27A overlap each other becomes larger, which causes the attraction force between them to become stronger. Since an area of an portion where the north pole of the permanent magnet 17 and the south pole of the permanent magnet 27B overlap each other becomes larger, the attraction force between them becomes stronger. Since an area of a portion where the south pole of the permanent magnet 18 and the north pole of the permanent magnet 28A overlap each other becomes smaller, the attraction force between them becomes weaker. Since an area of a portion where the north pole of the permanent magnet 18 and the south pole of the permanent magnet 28B overlap each other becomes smaller, the attraction force between them becomes weaker. As a result, the magnetic force in the X (+) direction materially acts upon the stylus support portion 2.

On the other hand, when the stylus support portion 2 is displaced in the X (−) direction, the area of the portion where the south pole of the permanent magnet 17 and the north pole of the permanent magnet 27A overlap each other becomes smaller, which causes the attraction force between them to become weaker. Since the area of the portion where the north pole of the permanent magnet 17 and the south pole of the permanent magnet 27B overlap each other becomes smaller, the attraction force between them becomes weaker. Since the area of the portion where the south pole of the permanent magnet 18 and the north pole of the permanent magnet 28A overlap each other becomes larger, the attraction force between them becomes stronger. Since the area of the portion where the north pole of the permanent magnet 18 and the south pole of the permanent magnet 28B overlap each other becomes larger, the attraction force between them becomes stronger. As a result, the magnetic force in the X (−) direction materially acts upon the stylus support portion 2.

Given the above, when the stylus support portion 2 is displaced in the X (+) direction, the spring force in the X (−) direction and the magnetic force in the X (+) direction act upon the stylus support portion 2. When the stylus support portion 2 is displaced in the X (−) direction, the spring force in the X (+) direction and the magnetic force in the X (−) direction act upon the stylus support portion 2. Accordingly, in the probe measuring force adjuster 400, it can be understood that the magnetic force acts upon the stylus support portion 2 so as to cancel out the spring force. Therefore, according to the probe measuring force adjuster 400, similar to the probe measuring force adjuster 100, it becomes possible to inhibit the magnitude of the force materially acting upon the stylus support portion 2 and to equalize the magnitude of the force. As a result, the measuring force acting upon the measured object can be inhibited and equalized.

Fifth Embodiment

Figure 13:
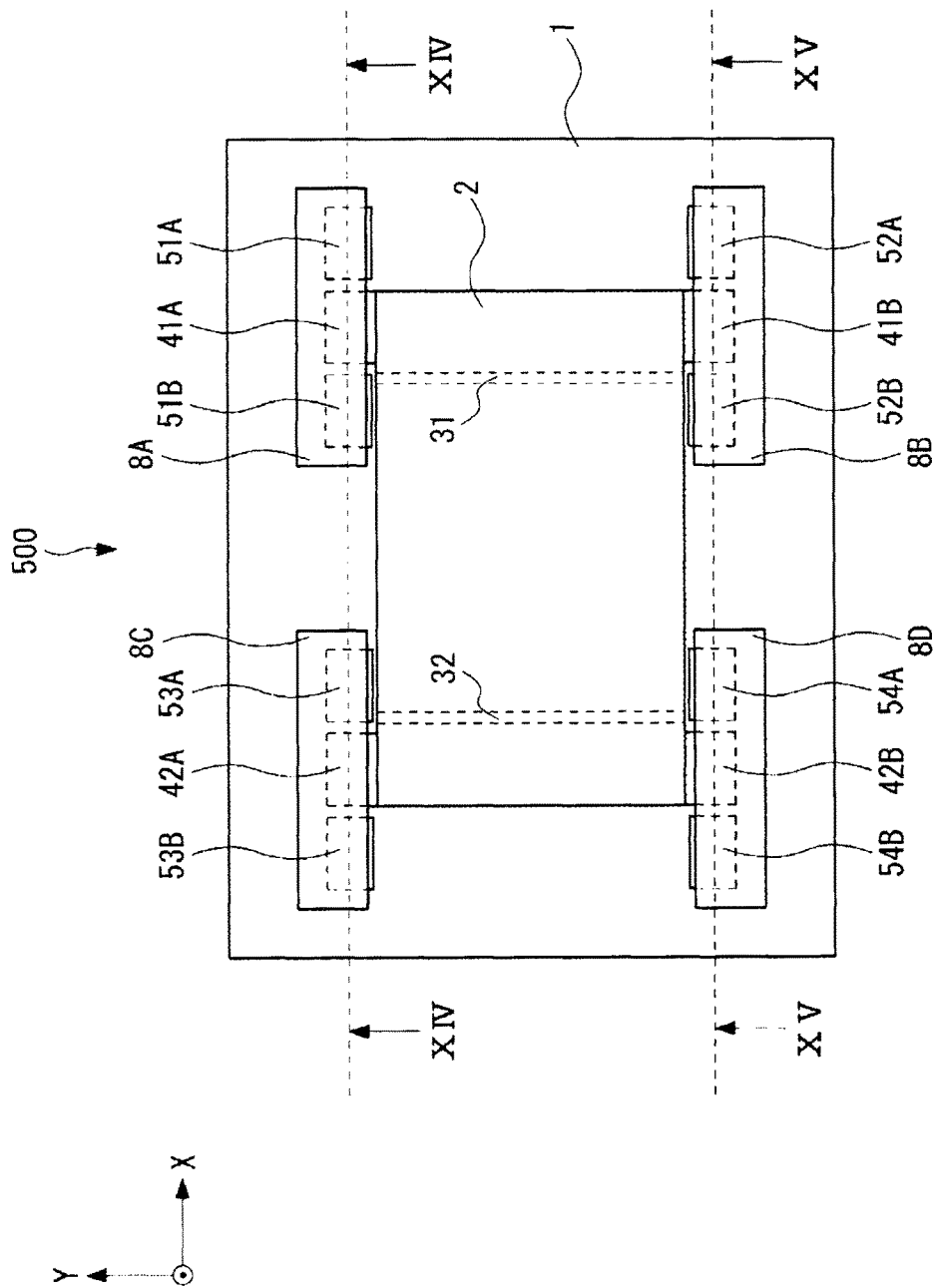
FIG. 13 is a top view schematically illustrating a configuration of a probe measuring force adjuster according to a fifth embodiment.
Figure 14:
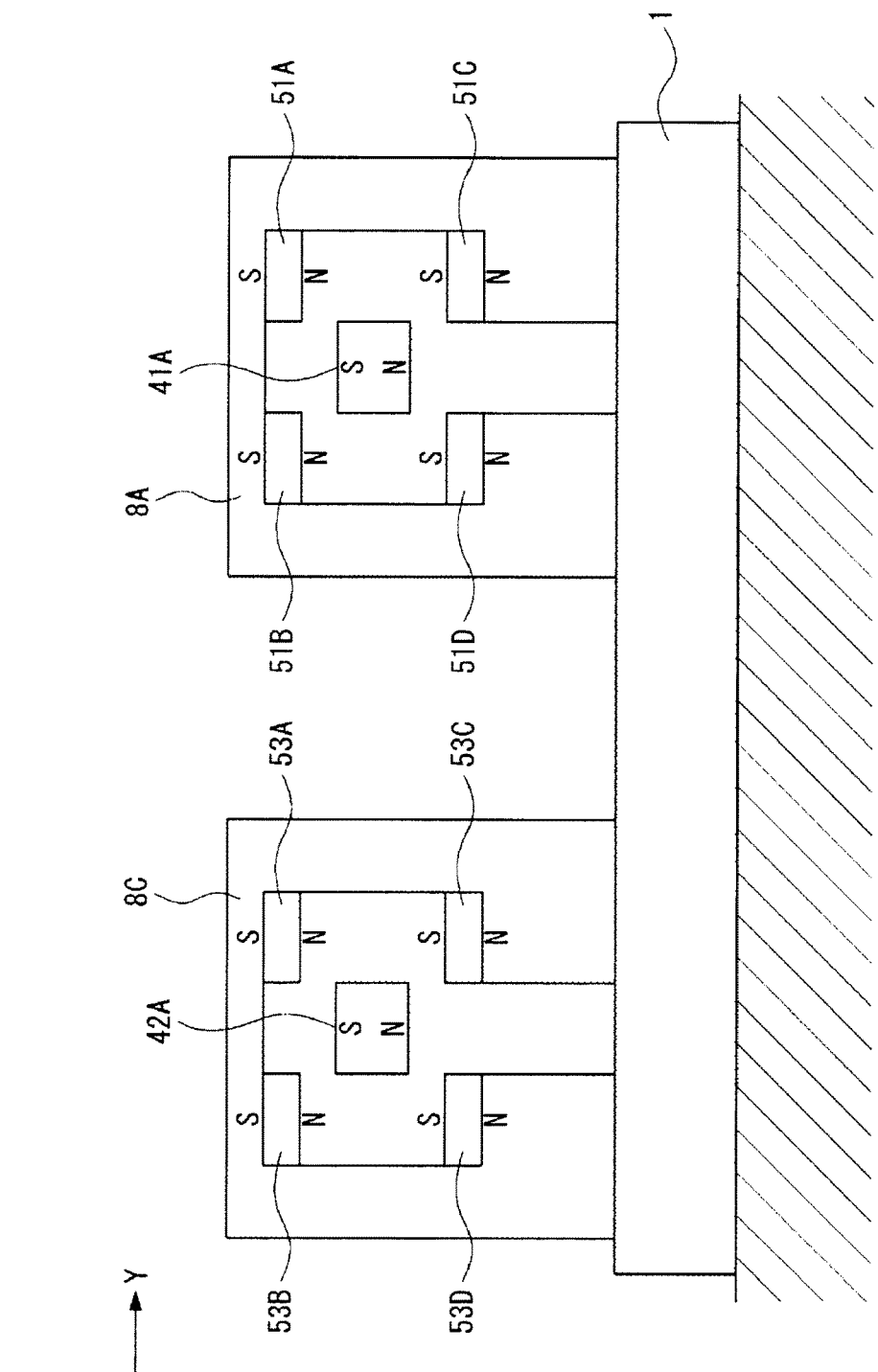
FIG. 14 is a cross-sectional view of the probe measuring force adjuster according to the fifth embodiment taken along a line XIV-XIV illustrated in FIG. 13.
Figure 15:
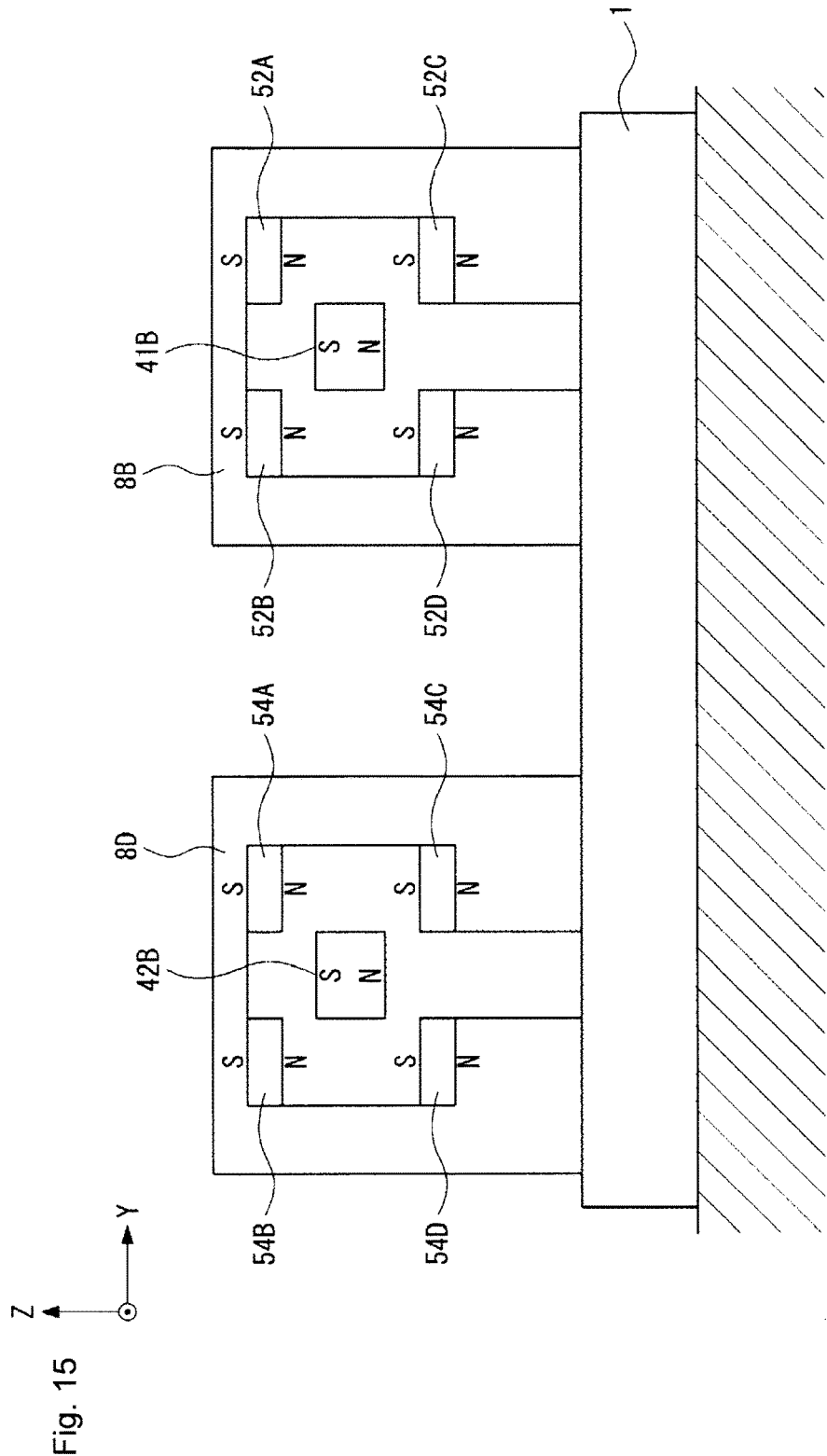
FIG. 15 is a cross-sectional view of the probe measuring force adjuster according to the fifth embodiment taken along a line XV-XV illustrated in FIG. 13.

A description is given of a probe measuring force adjuster 500 according to a fifth embodiment. FIG. 13 is a top view schematically illustrating a configuration of the probe measuring force adjuster 500 according to the fifth embodiment. FIG. 14 is a cross-sectional view of the probe measuring force adjuster 500 according to the fifth embodiment taken along a line XIV-XIV illustrated in FIG. 13. FIG. 15 is a cross-sectional view of the probe measuring force adjuster 500 according to the fifth embodiment taken along a line XV-XV illustrated in FIG. 13. The probe measuring force adjuster 500 has the base 1, the stylus support portion 2, columns 8A through 8D, permanent magnets 41A, 41B, 42A, and 42B, permanent magnets 51A through 51D, permanent magnets 52A through 52D, and the plate springs 31 and 32.

Since the base 1, the stylus support portion 2, and the plate springs 31 and 32 are similar to that of the first embodiment, description thereof is omitted. Each of the columns 8A through 8D is arranged on the base 1 so as to be on the outer side of one of the four corners of the stylus support portion 2, and projecting on the Z (+) side.

The permanent magnets 41A and 41B correspond to the first magnetic member. The permanent magnets 42A and 42B correspond to the second magnetic member. The permanent magnets 51A through 51D and 52A through 52D correspond to the third magnetic member. The permanent magnets 53A through 53D and 54A through 54D correspond to the fourth magnetic member. The base 1 and the columns 8A through 8D form a single fixed portion, which fixed portion corresponds to the first member.

The permanent magnet 41A is arranged on the X (+) side end portion of the Y (+) side surface of the stylus support portion 2. The permanent magnet 41B is arranged on the X (+) side end portion of the Y (−) side surface of the stylus support portion 2. The permanent magnet 42A is arranged on the X (−) side end portion of the Y (+) side surface of the stylus support portion 2. The permanent magnet 42B is arranged on the X (−) side end portion of the Y (−) side surface of the stylus support portion 2.

The permanent magnet 51A is arranged on an X (+) side of the column 8A above the permanent magnet 41A (Y (+) side), and the permanent magnet 51B is arranged on an X (−) side of the column 8A above the permanent magnet 41A. The permanent magnet 51C is arranged on the X (+) side of the column 8A below the permanent magnet 41A (Y (−) side), and the permanent magnet 51D is arranged on the X (−) side of the column 8A below the permanent magnet 41A. In this state, the permanent magnet 41A and the permanent magnets 51A through 51D are arranged so that an attraction force acts on areas therebetween. In the present embodiment, the Y (+) side surface of the permanent magnet 41A is the south pole, and the Y (−) side surface of the permanent magnet 41A is the north pole. A Y (+) side surface of each of the permanent magnets 51A through 51D is the south pole, and a Y (−) side surface of each of the permanent magnets 51A through 51D is the north pole.

The permanent magnet 52A is arranged on an X (+) side of the column 8B above the permanent magnet 41B (Y (+) side), and the permanent magnet 52B is arranged on an X (−) side of the column 8B above the permanent magnet 41B. The permanent magnet 52C is arranged on the X (+) side of the column 8B below the permanent magnet 41B (Y (−) side), and the permanent magnet 52D is arranged on the X (−) side of the column 8B below the permanent magnet 41B. In this state, the permanent magnet 41B and the permanent magnets 52A through 52D are arranged so that an attraction force acts on areas therebetween. In the present embodiment, the Y (+) side surface of the permanent magnet 41B is the south pole, and the Y (−) side surface of the permanent magnet 41B is the north pole. A Y (+) side surface of each of the permanent magnets 52A through 52D is the south pole, and a Y (−) side surface of each of the permanent magnets 52A through 52D is the north pole.

The permanent magnet 53A is arranged on an X (+) side of the column 8C above the permanent magnet 42A (Y (+)

side), and the permanent magnet 53B is arranged on an X (−) side of the column 8C above the permanent magnet 42A. The permanent magnet 53C is arranged on the X (+) side of the column 8C below the permanent magnet 42A (Y (−) side), and the permanent magnet 53D is arranged on the X (−) side of the column 8C below the permanent magnet 42A. In this state, the permanent magnet 42A and the permanent magnets 53A through 53D are arranged so that an attraction force acts on areas therebetween. In the present embodiment, the Y (+) side surface of the permanent magnet 42A is the south pole, and the Y (−) side surface of the permanent magnet 42A is the north pole. A Y (+) side surface of each of the permanent magnets 53A through 53D is the south pole, and a Y (−) side surface of each of the permanent magnets 53A through 53D is the north pole.

The permanent magnet 54A is arranged on an X (+) side of the column 8D above the permanent magnet 42B (Y (+) side), and the permanent magnet 54B is arranged on an X (−) side of the column 8D above the permanent magnet 42B. The permanent magnet 54C is arranged on the X (+) side of the column 8D below the permanent magnet 42B (Y (−) side), and the permanent magnet 54D is arranged on the X (−) side of the column 8D below the permanent magnet 42B. In this state, the permanent magnet 42B and the permanent magnets 54A through 54D are arranged so that an attraction force acts on areas therebetween. In the present embodiment, the Y (+) side surface of the permanent magnet 42B is the south pole, and the Y (−) side surface of the permanent magnet 42B is the north pole. A Y (+) side surface of each of the permanent magnets 54A through 54D is the south pole, and a Y (−) side surface of each of the permanent magnets 54A through 54D is the north pole.

In the probe measuring force adjuster 500, similar to the probe measuring force adjuster 100, the stylus 9 (not shown in the drawings) having probes that make contact with the measured object provided thereto is attached to the stylus support portion 2 so as to project on the Z (+) side. Similar to the probe measuring force adjuster 100, when the force in the X (+) direction is applied to the stylus 9, the stylus support portion 2 is displaced in the X (+) direction, and when the force in the X (−) direction is applied to the stylus 9, the stylus support portion 2 is displaced in the X (−) direction. In this state, the spring force generated by the plate springs 31 and 32 is applied to the stylus support portion 2 in response to the displacement of the stylus support portion 2 in the X direction, similar to the probe measuring force adjuster 100.

In addition, the attraction force generated by the magnetic force of the permanent magnets (permanent magnets 41A, 41B, 42A, 42B; 51A through 51D; 52A through 52D; 53A through 53D; and 54A through 54D) acts on areas between the stylus support portion 2 and the columns 8A, 8B, 8C and 8D.

When the stylus support portion 2 is displaced in the X (+) direction, an area of a portion where the permanent magnet 41A and each of the permanent magnets 51A and 51B overlap each other becomes larger, which causes the attraction force between the permanent magnet 41A and each of the permanent magnets 51A and 51B to become stronger. Since an area of a portion where the permanent magnet 41A and each of the permanent magnets 51C and 51D overlap each other becomes smaller, the attraction force between the permanent magnet 41A and each of the permanent magnets 51C and 51D becomes weaker. Since an area of a portion where the permanent magnet 42A and each of the permanent magnets 52A and 52B overlap each other becomes larger, the attraction force between the permanent magnet 42A and each of the permanent magnets 52A and 52B becomes stronger. Since an area of a portion where the permanent magnet 42A and each of the permanent magnets 52C and 52D overlap each other becomes smaller, the attraction force between the permanent magnet 42A and each of the permanent magnets 52C and 52D becomes weaker. Since an area of a portion where the permanent magnet 42A and each of the permanent magnets 53A and 53B overlap each other becomes larger, the attraction force between the permanent magnet 42A and each of the permanent magnets 53A and 53B becomes stronger. Since an area of a portion where the permanent magnet 42A and each of the permanent magnets 53C and 53D overlap each other becomes smaller, the attraction force between the permanent magnet 42A and each of the permanent magnets 53C and 53D becomes weaker. Since an area of a portion where the permanent magnet 42B and each of the permanent magnets 54A and 54B overlap each other becomes larger, the attraction force between the permanent magnet 42B and each of the permanent magnets 54A and 54B becomes stronger. Since an area of a portion where the permanent magnet 42B and each of the permanent magnets 54C and 54D overlap each other becomes smaller, the attraction force between the permanent magnet 42B and each of the permanent magnets 54C and 54D becomes weaker. As a result, the magnetic force in the X (+) direction materially acts upon the stylus support portion 2.

On the other hand, when the stylus support portion 2 is displaced in the X (−) direction, the area of the portion where the permanent magnet 41A and each of the permanent magnets 51A and 51B overlap each other becomes smaller, which causes the attraction force between the permanent magnet 41A and each of the permanent magnets 51A and 51B to become weaker. Since the area of the portion where the permanent magnet 41A and each of the permanent magnets 51C and 51D overlap each other becomes larger, the attraction force between the permanent magnet 41A and each of the permanent magnets 51C and 51D becomes stronger. Since the area of the portion where the permanent magnet 42A and each of the permanent magnets 52A and 52B overlap each other becomes smaller, the attraction force between the permanent magnet 42A and each of the permanent magnets 52A and 52B becomes weaker. Since the area of the portion where the permanent magnet 42A and each of the permanent magnets 52C and 52D overlap each other becomes larger, the attraction force between the permanent magnet 42A and each of the permanent magnets 52C and 52D becomes stronger. Since the area of the portion where the permanent magnet 42A and each of the permanent magnets 53A and 53B overlap each other becomes smaller, the attraction force between the permanent magnet 42A and each of the permanent magnets 53A and 53B becomes weaker. Since the area of the portion where the permanent magnet 42A and each of the permanent magnets 53C and 53D overlap each other becomes larger, the attraction force between the permanent magnet 42A and each of the permanent magnets 53C and 53D becomes stronger. Since the area of the portion where the permanent magnet 42B and each of the permanent magnets 54A and 54B overlap each other becomes smaller, the attraction force between the permanent magnet 42B and each of the permanent magnets 54A and 54B becomes weaker. Since the area of the portion where the permanent magnet 42B and each of the permanent magnets 54C and 54D overlap each other becomes larger, the attraction force between the permanent magnet 42B and each of the permanent magnets 54C and 54D becomes stronger. As a result, the magnetic force in the X (−) direction materially acts upon the stylus support portion 2.

Given the above, when the stylus support portion 2 is displaced in the X (+) direction, the spring force in the X (−) direction and the magnetic force in the X (+) direction act upon the stylus support portion 2. When the stylus support portion 2 is displaced in the X (−) direction, the spring force in the X (+) direction and the magnetic force in the X (−) direction act upon the stylus support portion 2. Accordingly, in the probe measuring force adjuster 500, it can be understood that the magnetic force acts upon the stylus support portion 2 so as to cancel out the spring force. Therefore, according to the probe measuring force adjuster 500, similar to the probe measuring force adjuster 100, it becomes possible to inhibit the magnitude of the force materially acting upon the stylus support portion 2 and to equalize the magnitude of the force. As a result, the measuring force acting upon the measured object can be inhibited and equalized.

Sixth Embodiment

Figure 16:
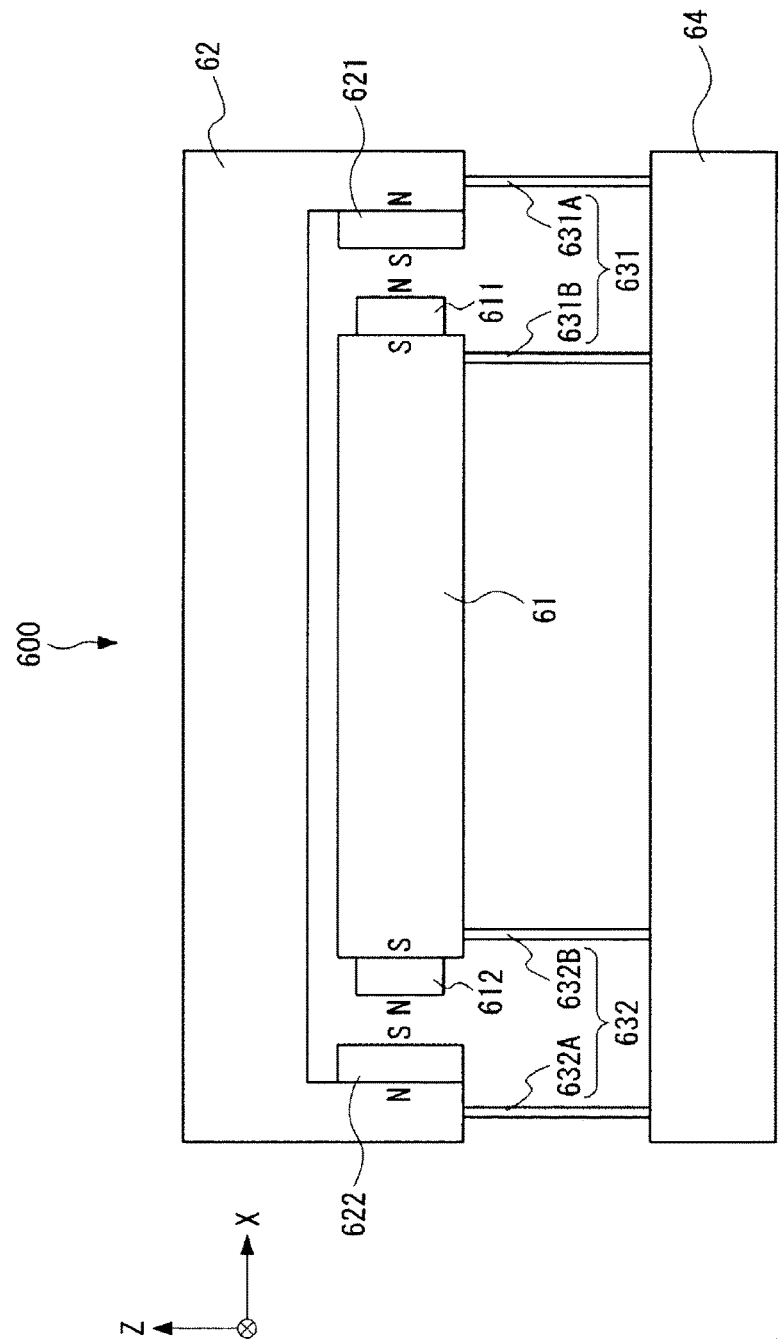
FIG. 16 is a front view schematically illustrating a configuration of a probe measuring force adjuster according to a sixth embodiment.

A description is given of a probe measuring force adjuster 600 according to a sixth embodiment. FIG. 16 is a front view schematically illustrating a configuration of the probe measuring force adjuster 600 according to the sixth embodiment. The probe measuring force adjuster 600 has a base 61, a stylus support portion 62, a hinge attaching member 64, permanent magnets 611 and 612, permanent magnets 621 and 622, and elastic hinges 631 and 632.

The permanent magnet 611 corresponds to the first magnetic member. The permanent magnet 612 corresponds to the second magnetic member. The permanent magnet 621 corresponds to the third magnetic member. The permanent magnet 622 corresponds to the fourth magnetic member.

The base 61 is a portion fixated to a measuring device (such as a coordinate measuring machine). In order to simplify the figure, details of the measuring device are not shown in FIG. 16.

The elastic hinges 631 and 632 are arranged in parallel on the base 61 so as to be separated from each other in the X direction. The elastic hinge 631 includes each of plate springs 631A and 631B having an X-Z plane as a principal surface and arranged so as to be separated from each other in the X direction. The elastic hinge 632 includes each of plate springs 632A and 632B having the X-Z plane as a principal surface and arranged so as to be separated from each other in the X direction.

The elastic hinges 631 and 632 correspond to the first flat plate-like elastic member and the second flat plate-like elastic member, respectively. The plate springs 631A and 631B of the elastic hinge 631 correspond to a third flat plate-like elastic member and a fourth flat plate-like elastic member, respectively. The plate springs 632A and 632B of the elastic hinge 632 correspond to a fifth flat plate-like elastic member and a sixth flat plate-like elastic member, respectively.

The stylus support portion 62 is arranged so as to face the base 61 and be separated therefrom in a Z (+) direction. The base 61 and the stylus support portion 62 are connected across the plate spring 631A of the elastic hinge 631 and the plate spring 632A of the elastic hinge 632.

The stylus support portion 62 is arranged so as to face the base 61 via the hinge attaching member 64 and be separated from the base 61 in a Z (−) direction. The base 61 and the hinge attaching member 64 are connected via the plate spring 631B of the elastic hinge 631 and the plate spring 632B of the elastic hinge 632, and are movable in the X direction. The permanent magnet 611 is provided to an end portion on an X (+) side of the stylus support portion 62, and the permanent magnet 612 is provided to an end portion on an X (−) side of the stylus support portion 62.

The permanent magnet 621 is arranged on a column 63A so as to face the permanent magnet 611. In this state, the permanent magnet 611 and the permanent magnet 621 are provided to have mutually different magnetic poles so that an attraction force acts on an area therebetween. In the present embodiment, an X (+) side surface of the permanent magnet 611 is the north pole, and an X (−) side surface of the permanent magnet 611 is the south pole. An X (+) side surface of the permanent magnet 621 is the north pole, and an X (−) side surface of the permanent magnet 621 is the south pole.

The permanent magnet 622 is arranged on a column 63B so as to face the permanent magnet 612. In this state, the permanent magnet 612 and the permanent magnet 622 are provided to have mutually different magnetic poles so that an attraction force acts on an area therebetween. In the present embodiment, an X (+) side surface of the permanent magnet 612 is the south pole, and an X (−) side surface of the permanent magnet 612 is the north pole. An X (+) side surface of the permanent magnet 622 is the south pole, and an X (−) side surface of the permanent magnet 622 is the north pole.

In the probe measuring force adjuster 600, a stylus that makes contact with the measured object is attached to the stylus support portion 62. The stylus is attached to the stylus support portion 62 so as to project on the Z (+) side. In the probe measuring force adjuster 600, when a force in the X (+) direction is applied to the stylus 9, each of the elastic hinges 631 and 632 deforms with a joint portion with the base 61 thereof being the fixed end, and the stylus support portion 62 is displaced in the X (+) direction. When a force in the X (−) direction is applied to the stylus 9, each of the elastic hinges 631 and 632 deforms, and the stylus support portion 62 is displaced in the X (−) direction. In this state, a spring force generated by the elastic hinges 631 and 632 is applied to the stylus support portion 62 in response to the displacement of the stylus support portion 62 in the X direction.

In addition, the attraction force generated by the magnetic force of the permanent magnets (permanent magnets 611, 612, 621, and 622) acts on areas between the stylus support portion 62 and each of the columns 63A and 63B. When the stylus support portion 62 is displaced in the X (+) direction, the permanent magnet 611 and the permanent magnet 621 approach each other, which causes the attraction force between them to become stronger. At the same time, since the permanent magnet 612 and the permanent magnet 622 move away from each other, the attraction force between them becomes weaker. As a result, the magnetic force in the X (+) direction materially acts upon the stylus support portion 62. On the other hand, when the stylus support portion 62 is displaced in the X (−) direction, the permanent magnet 611 and the permanent magnet 621 move away from each other, which causes the attraction force between them to become weaker. At the same time, since the permanent magnet 612 and the permanent magnet 622 approach each other, the attraction force between them becomes stronger. As a result, the magnetic force in the X (−) direction materially acts upon the stylus support portion 62.

Given the above, when the stylus support portion 62 is displaced in the X (+) direction, the spring force in the X (−) direction and the magnetic force in the X (+) direction act upon the stylus support portion 62. When the stylus support portion 62 is displaced in the X (−) direction, the spring force in the X (+) direction and the magnetic force in the X (−) direction act upon the stylus support portion 62. Accordingly, in the probe measuring force adjuster 600, it can be understood that the magnetic force acts upon the stylus support portion 62 so as to cancel out the spring force, similar to the probe measuring force adjuster 100. Therefore, it becomes possible to inhibit the magnitude of the force materially acting upon the stylus support portion 62 and to equalize the magnitude of the force. As a result, the measuring force acting upon the measured object can be inhibited and equalized.

Seventh Embodiment

Figure 17:
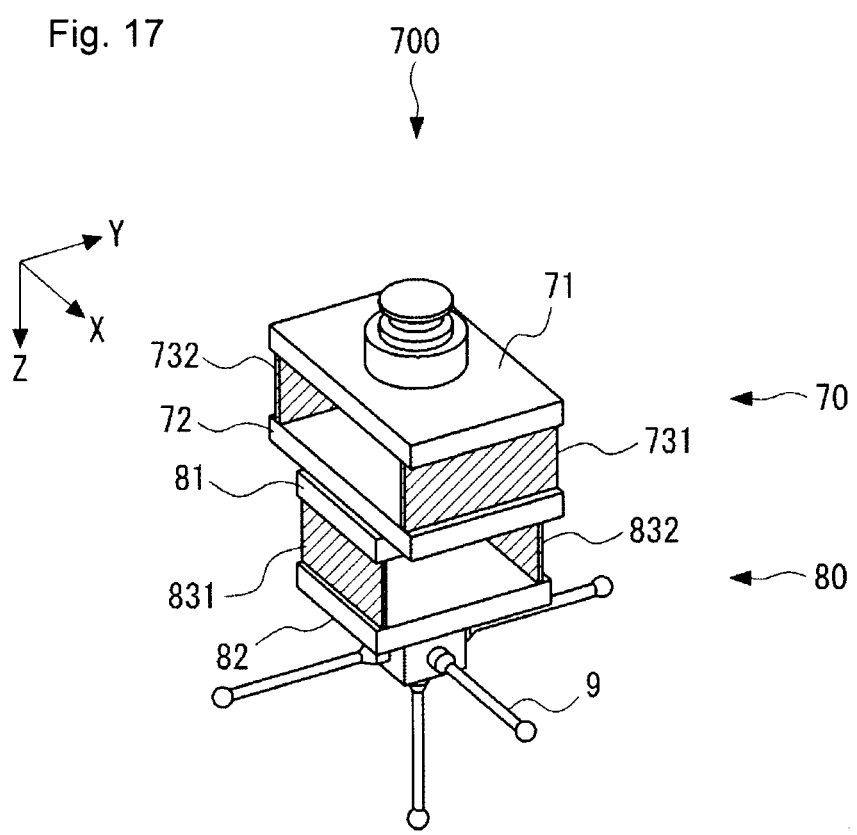
FIG. 17 is a perspective view schematically illustrating a configuration of a probe measuring force adjuster according to a seventh embodiment.

A description is given of a probe measuring force adjuster 700 according to a seventh embodiment. FIG. 17 is a perspective view schematically illustrating a configuration of the probe measuring force adjuster 700 according to the seventh embodiment. The probe measuring force adjuster 700 has an X-axis measuring force adjuster portion 70 and a Y-axis measuring force adjuster portion 80. The X-axis measuring force adjuster portion 70 and the Y-axis measuring force adjuster portion 80 each has a configuration similar to that of the probe measuring force adjuster 100. The X-axis measuring force adjuster portion 70 is referred to as a first measuring force adjuster. The Y-axis measuring force adjuster portion 80 is referred to as a second measuring force adjuster. In order to simplify the figure, columns and permanent magnets are not shown in FIG. 17.

Figure 18:
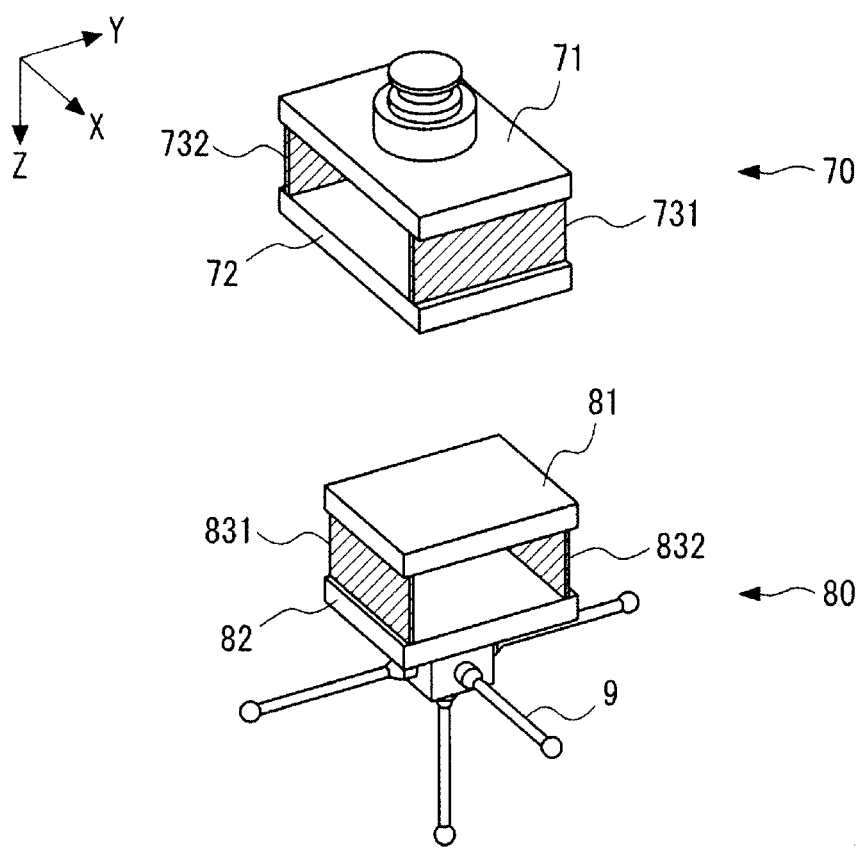
FIG. 18 is a perspective view illustrating a case in which an X-axis measuring force adjuster portion and a Y-axis measuring force adjuster portion of the probe measuring force adjuster according to the seventh embodiment are separated from each other.

FIG. 18 is a perspective view illustrating a case in which the X-axis measuring force adjuster portion 70 and the Y-axis measuring force adjuster portion 80 of the probe measuring force adjuster 700 according to the seventh embodiment are separated from each other. The Y-axis measuring force adjuster portion 80 is arranged in a position rotated by 90 degrees around the Z axis with respect to the X-axis measuring force adjuster portion 70. In order to simplify the figure, columns and permanent magnets are not shown in FIG. 18.

The X-axis measuring force adjuster portion 70 has a base 71, a support portion 72, a column 73A and a column 73B, permanent magnets 711 and 712, permanent magnets 721 and 722, and plate springs 731 and 732. The base 71, the support portion 72, the column 73A and the column 73B, the permanent magnets 711 and 712, the permanent magnets 721 and 722, and the plate springs 731 and 732 correspond to the base 1, the stylus support portion 2, the column 3A and the column 3B, the permanent magnets 11 and 12, the permanent magnets 21 and 22, and the plate springs 31 and 32 of the probe measuring force adjuster 100, respectively.

The base 71 of the X-axis measuring force adjuster portion 70 is fixated to a body of a measuring device (not shown in the drawings) such as a coordinate measuring machine. Since the X-axis measuring force adjuster portion 70 has a configuration similar to that of the probe measuring force adjuster 100, it is possible for the support portion 72 of the X-axis measuring force adjuster portion 70 to be displaced in the X direction.

The Y-axis measuring force adjuster portion 80 has a base 81, a support portion 82, a column 83A and a column 83B, permanent magnets 811 and 812, permanent magnets 821 and 822, and plate springs 831 and 832. The base 81, the support portion 82, the column 83A and the column 83B, the permanent magnets 811 and 812, the permanent magnets 821 and 822, and the plate springs 831 and 832 correspond to the base 1, the stylus support portion 2, the column 3A and the column 3B, the permanent magnets 11 and 12, the permanent magnets 21 and 22, and the plate springs 31 and 32 of the probe measuring force adjuster 100, respectively.

The base 81 of the Y-axis measuring force adjuster portion 80 is connected to the support portion 72 of the X-axis measuring force adjuster portion 70. As described above, in this state, the Y-axis measuring force adjuster portion 80 is arranged in the position rotated by 90 degrees around the Z axis with respect to the X-axis measuring force adjuster portion 70. Since the Y-axis measuring force adjuster portion 80 has a configuration similar to that of the probe measuring force adjuster 100, it is possible for the support portion 82 of the Y-axis measuring force adjuster portion 80 to be displaced in the Y direction. The stylus 9 is attached to the support portion 82 of the Y-axis measuring force adjuster portion 80.

According to the configuration described above, the base 82 of the Y-axis measuring force adjuster portion 80 can be displaced biaxially in the X and Y directions with respect to the base 71 of the X-axis measuring force adjuster portion 70.

Thus, according to the present configuration, it can be understood that when the probe is displaced in the biaxial direction (the X and Y directions), the magnetic force acts in the biaxial direction (the X and Y directions) to cancel out the spring force generated by the displacement. Therefore, it becomes possible to inhibit the magnitude of the force in the biaxial direction (the X and Y directions) materially acting upon the probe and to equalize the magnitude of the force. As a result, the measuring force acting upon the measured object can be inhibited and equalized.

Eighth Embodiment

Figure 19:
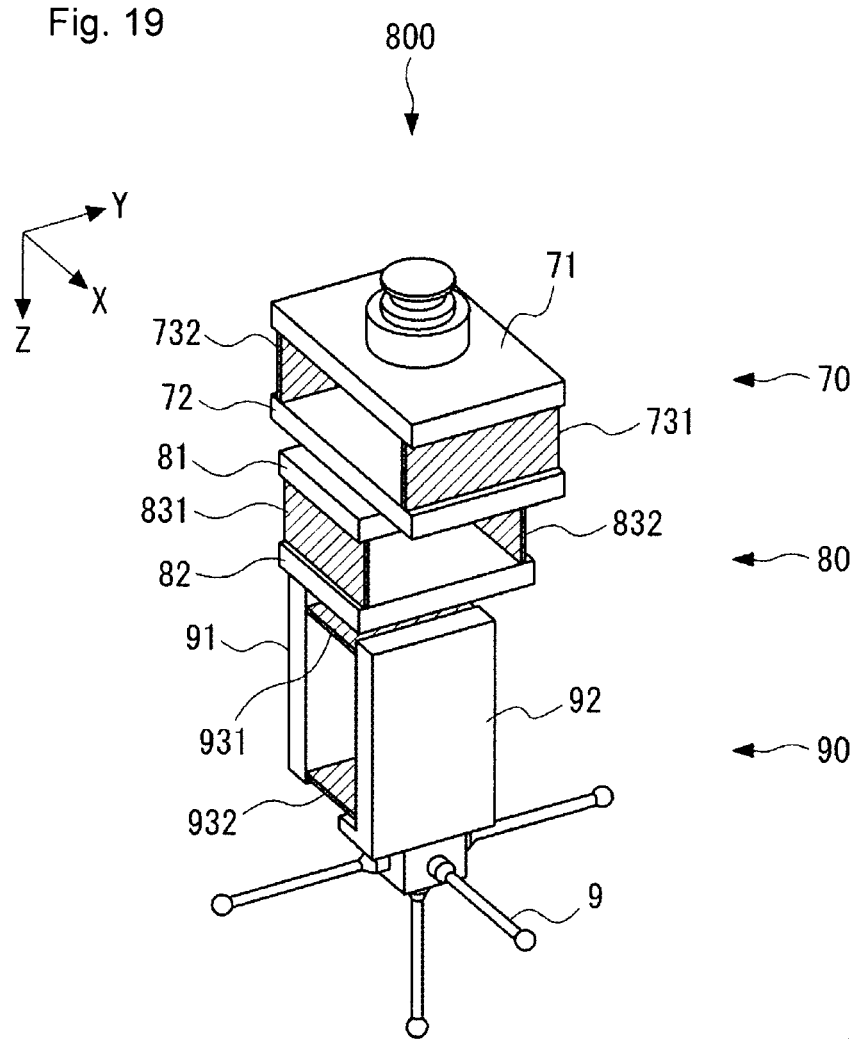
FIG. 19 is a perspective view schematically illustrating a configuration of a probe measuring force adjuster according to an eighth embodiment.

A description is given of a probe measuring force adjuster 800 according to an eighth embodiment. FIG. 19 is a perspective view schematically illustrating a configuration of the probe measuring force adjuster 800 according to the eighth embodiment. The probe measuring force adjuster 800 has a configuration in which a Z-axis measuring force adjuster portion 90 is added to the probe measuring force adjuster 700 according to the seventh embodiment. The Z-axis measuring force adjuster portion 90 has a configuration similar to that of the probe measuring force adjuster 100. The Z-axis measuring force adjuster portion 90 is referred to as a third measuring force adjuster. In order to simplify the figure, columns and permanent magnets are not shown in FIG. 19.

Figure 20:
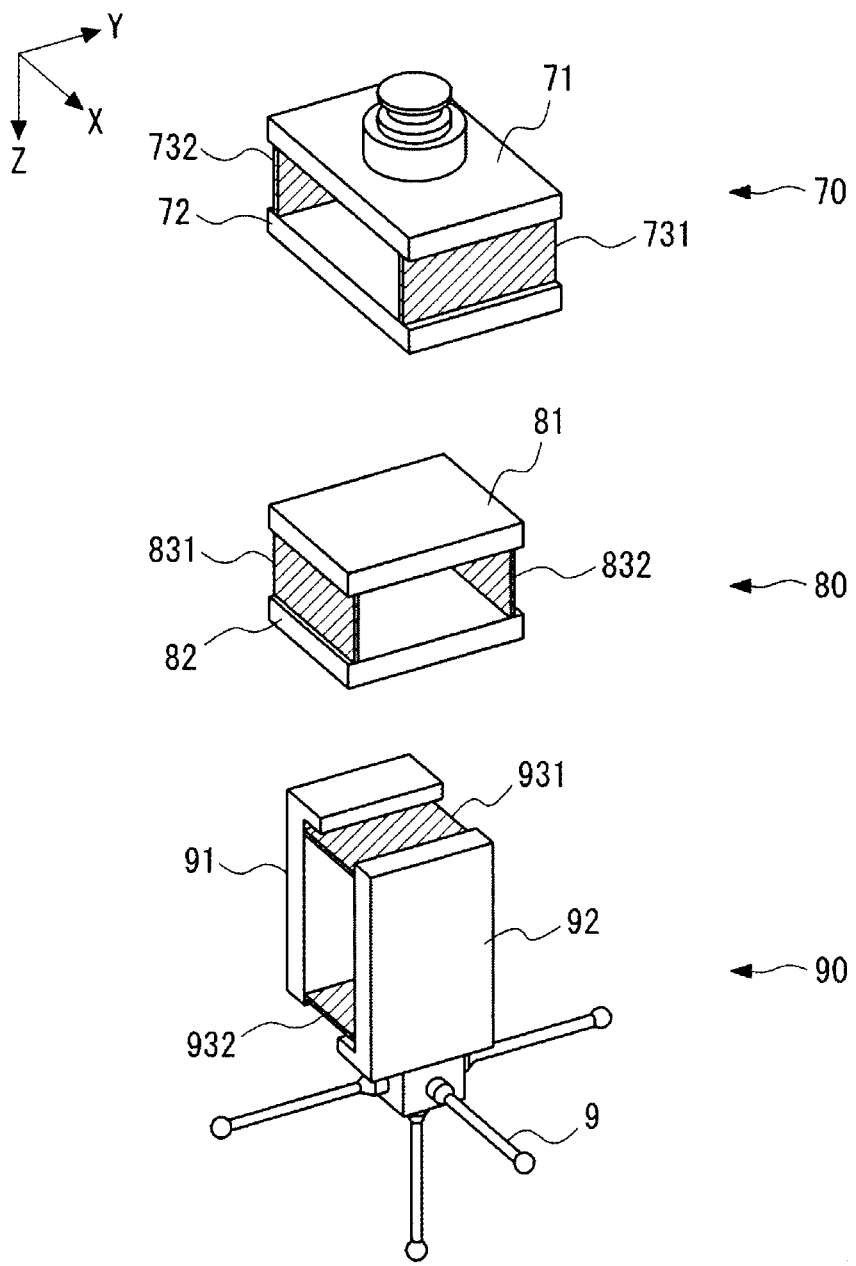
FIG. 20 is a perspective view illustrating a case in which an X-axis measuring force adjuster portion, a Y-axis measuring force adjuster portion, and a Z-axis measuring force adjuster portion of the probe measuring force adjuster according to the eighth embodiment are separated from one another.

FIG. 20 is a perspective view illustrating a case in which the X-axis measuring force adjuster portion 70, the Y-axis measuring force adjuster portion 80, and the Z-axis measuring force adjuster portion 90 of the probe measuring force adjuster 800 according to the eighth embodiment are separated from one another. The Z-axis measuring force adjuster portion 90 is arranged in a position rotated by 90 degrees around one of the X axis and the Y axis with respect to the X-axis measuring force adjuster portion 70 and the Y-axis measuring force adjuster portion 80. In order to simplify the figure, columns and permanent magnets are not shown in FIG. 20.

The Z-axis measuring force adjuster portion 90 has a base 91, a support portion 92, a column 93A and a column 93B, permanent magnets 911 and 912, permanent magnets 921 and 922, and plate springs 931 and 932. The base 91, the support portion 92, the column 93A and the column 93B, the permanent magnets 911 and 912, the permanent magnets 921 and 922, and the plate springs 931 and 932 correspond to the base 1, the stylus support portion 2, the column 3A and the column 3B, the permanent magnets 11 and 12, the permanent magnets 21 and 22, and the plate springs 31 and 32 of the probe measuring force adjuster 100, respectively.

The base 91 of the Z-axis measuring force adjuster portion 90 is connected to the support portion 82 of the Y-axis measuring force adjuster portion 80. As described above, in this state, the Z-axis measuring force adjuster portion 90 is arranged in the position rotated by 90 degrees around one of the X axis and the Y axis with respect to the X-axis measuring force adjuster portion 70 and the Y-axis measuring force adjuster portion 80. Since the Z-axis measuring force adjuster portion 90 has a configuration similar to that of the probe measuring force adjuster 100, it is possible for the support portion 92 of the Z-axis measuring force adjuster portion 90 to be displaced in the Z direction. The stylus 9 is attached to the support portion 92 of the Z-axis measuring force adjuster portion 90.

According to the configuration described above, the support portion 92 of the Z-axis measuring force adjuster portion 90 can be displaced triaxially in the X, Y, and Z directions with respect to the base 71 of the X-axis measuring force adjuster portion 70.

Thus, according to the present configuration, it can be understood that when the probe is displaced in the triaxial direction (the X, Y, and Z directions), the magnetic force acts in the triaxial direction (the X, Y, and Z directions) to cancel out the spring force generated by the displacement. Therefore, it becomes possible to inhibit the magnitude of the force in the triaxial direction (the X, Y, and Z directions) materially acting upon the probe and to equalize the magnitude of the force. As a result, the measuring force acting upon the measured object can be inhibited and equalized.

Ninth Embodiment

Figure 21:
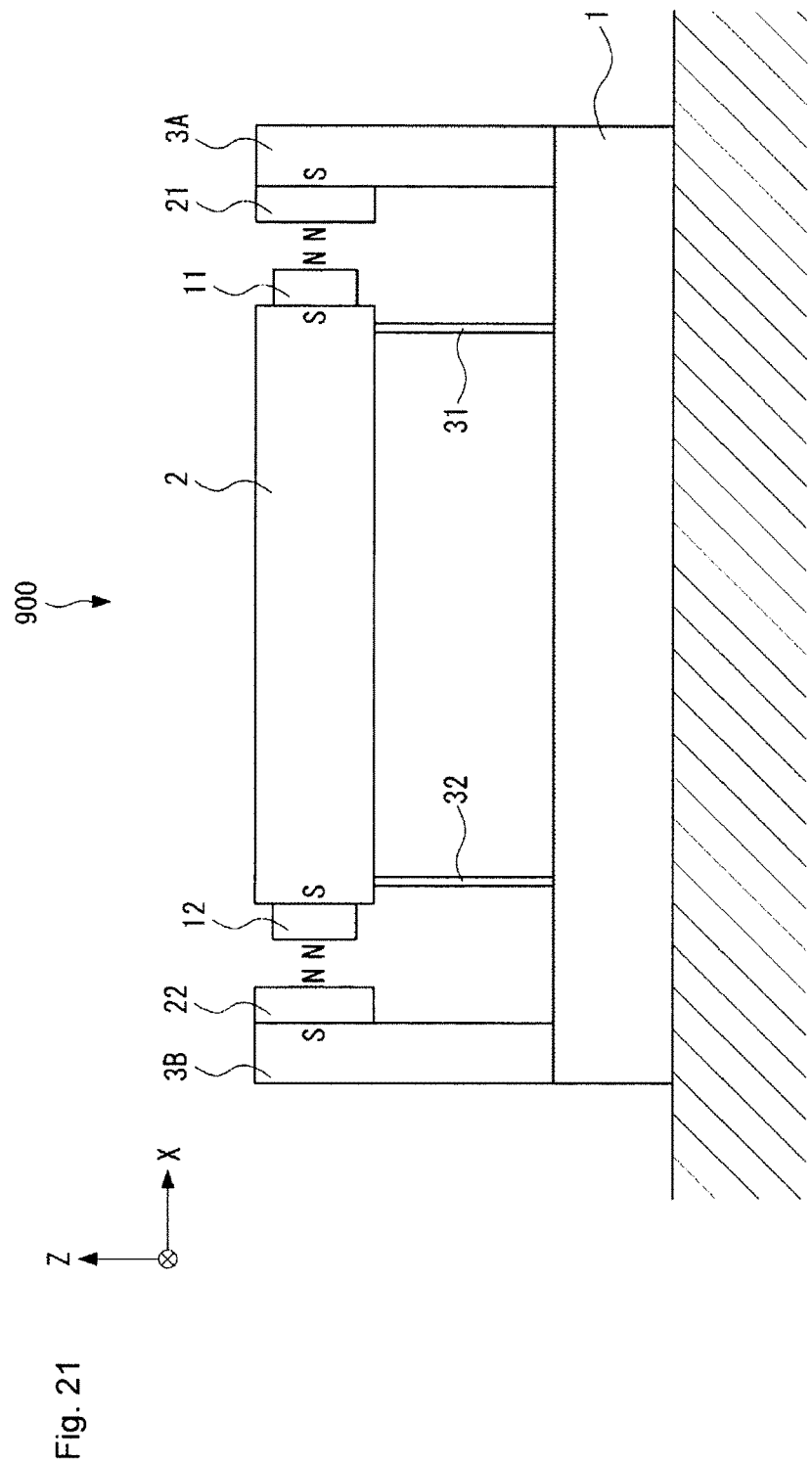
FIG. 21 is a front view schematically illustrating a configuration of a probe measuring force adjuster according to a ninth embodiment.

A description is given of a probe measuring force adjuster 900 according to a ninth embodiment. FIG. 21 is a front view schematically illustrating a configuration of the probe measuring force adjuster 900 according to the ninth embodiment. The probe measuring force adjuster 900 is a modification of the probe measuring force adjuster 100 according to the first embodiment in which a repulsive force generated by the magnetic force acts on the area between the permanent magnet 11 and the permanent magnet 21 and the area between the permanent magnet 12 and the permanent magnet 22.

As illustrated in FIG. 21, in the probe measuring force adjuster 900, the X (+) side surface of the permanent magnet 11 is the south pole, and the X (−) side surface of the permanent magnet 11 is the north pole. The X (+) side surface of the permanent magnet 21 is the north pole, and the X (−) side surface of the permanent magnet 21 is the south pole. The X (+) side surface of the permanent magnet 12 is the south pole, and the X (−) side surface of the permanent magnet 12 is the north pole. The X (+) side surface of the permanent magnet 22 is the north pole, and the X (−) side surface of the permanent magnet 22 is the south pole.

Figure 22:
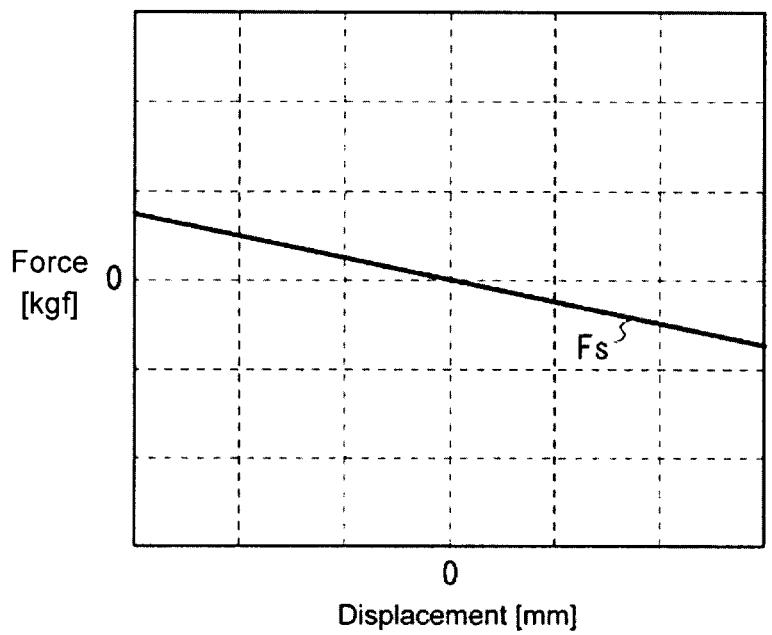
FIG. 22 is a graph illustrating the spring force which acts upon the probe measuring force adjuster according to the ninth embodiment.

FIG. 22 is a graph illustrating the spring force which acts upon the probe measuring force adjuster 900 according to the ninth embodiment. As illustrated in FIG. 22, the spring force Fs is calculated as the product of the spring constant of the plate springs 31 and 32 and the displacement of the stylus support portion 2.

Figure 23:
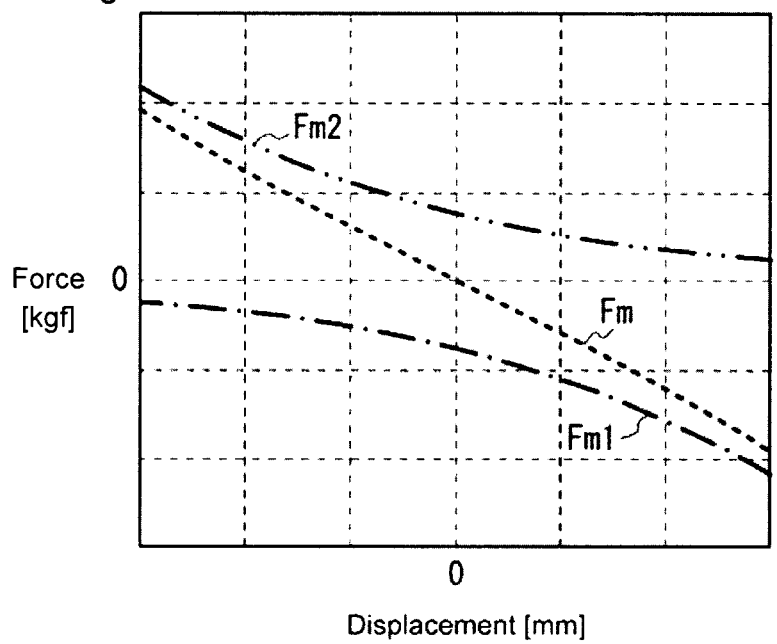
FIG. 23 is a graph illustrating the magnetic force which acts upon the probe measuring force adjuster according to the ninth embodiment.

The repulsive force generated by the magnetic force of the permanent magnets (permanent magnets 11, 12, 21, and 22) acts on the areas between the stylus support portion 2 and each of the columns 3A and 3B. FIG. 23 is a graph illustrating the magnetic force which acts upon the probe measuring force adjuster 900 according to the ninth embodiment. When the stylus support portion 2 is displaced in the X (+) direction, the permanent magnet 11 and the permanent magnet 21 approach each other, which causes the repulsive force Fm1 between them to become stronger. At the same time, since the permanent magnet 12 and the permanent magnet 22 move away from each other, the repulsive force Fm2 between them becomes weaker. As a result, the magnetic force Fm in the X (−) direction materially acts upon the stylus support portion 2. On the other hand, when the stylus support portion 2 is displaced in the X (−) direction, the permanent magnet 11 and the permanent magnet 21 move away from each other, which causes the repulsive force Fm1 between them to become weaker. At the same time, since the permanent magnet 12 and the permanent magnet 22 approach each other, the repulsive force Fm2 between them becomes stronger. As a result, the magnetic force Fm in the X (+) direction materially acts upon the stylus support portion 2.

Figure 24:
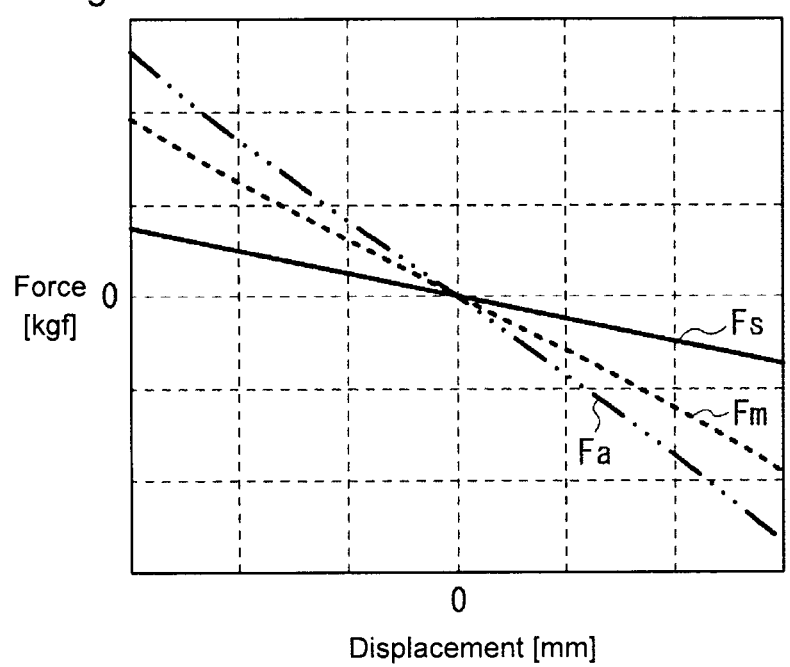
FIG. 24 is a graph illustrating the resultant force of the spring force and the magnetic force which acts upon the probe measuring force adjuster according to the ninth embodiment.

Given the above, when the stylus support portion 2 is displaced in the X (+) direction, the spring force in the X (−) direction and the magnetic force in the X (−) direction act upon the stylus support portion 2. When the stylus support portion 2 is displaced in the X (−) direction, the spring force in the X (+) direction and the magnetic force in the X (+) direction act upon the stylus support portion 2. FIG. 24 is a graph illustrating the resultant force of the spring force and the magnetic force which acts upon the probe measuring force adjuster 900 according to the ninth embodiment. As illustrated in FIG. 24, in the probe measuring force adjuster 900, it can be understood that the magnetic force acts upon the stylus support portion 2 in the same direction as the spring force. Therefore, it becomes possible to increase the magnitude of the force Fa materially acting upon the stylus support portion 2. As a result, the measuring force acting upon the measured object can be increased, thereby enhancing responsiveness of the measurement.

Tenth Embodiment

Figure 25:
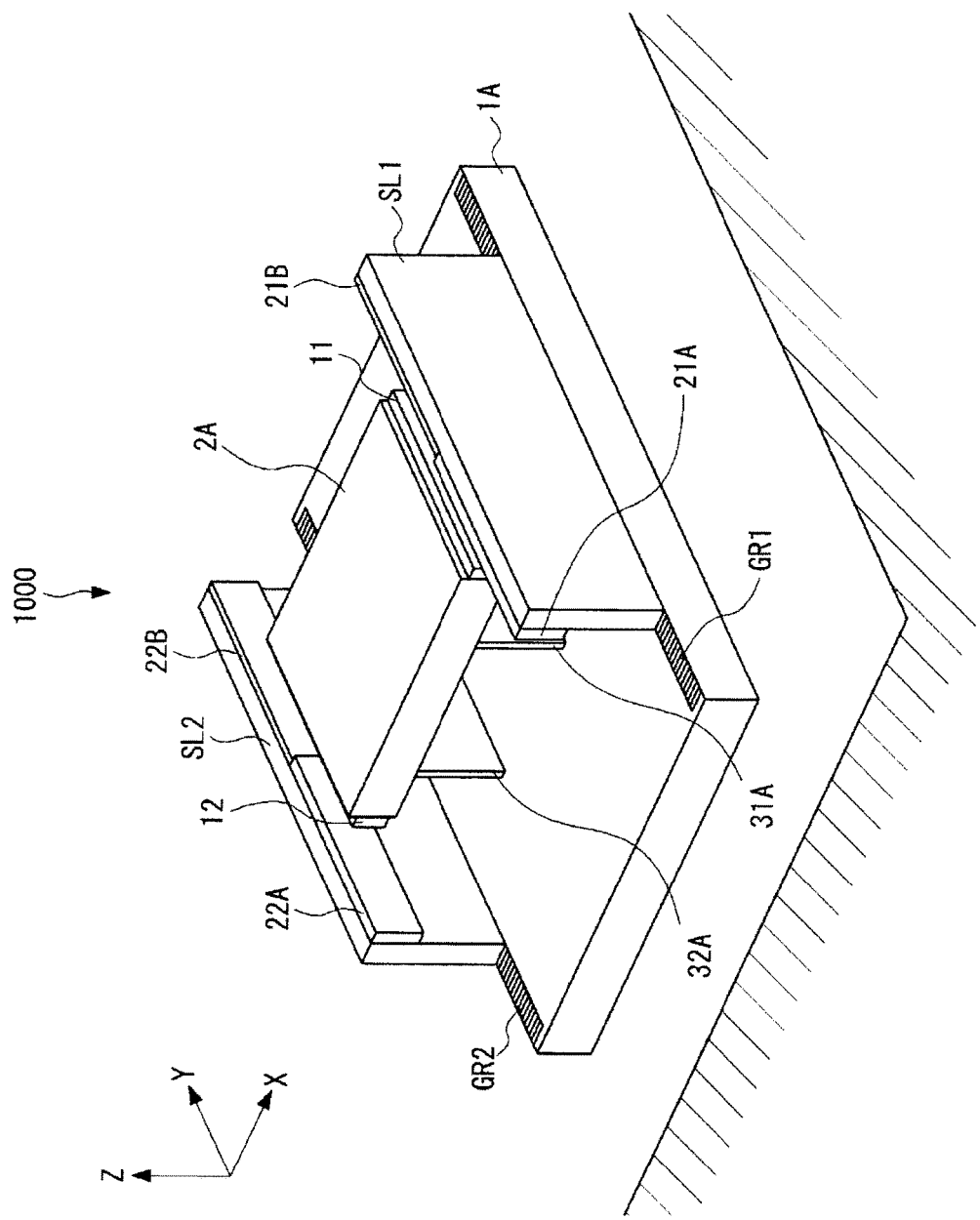
FIG. 25 is a perspective view schematically illustrating a configuration of a probe measuring force adjuster according to a tenth embodiment.

A description is given of a probe measuring force adjuster 1000 according to a tenth embodiment. The probe measuring force adjuster 1000 according to the present embodiment is configured as a modification of the probe measuring force adjuster 100 according to the first embodiment. FIG. 25 is a perspective view schematically illustrating a configuration of the probe measuring force adjuster 1000 according to the tenth embodiment.

In the present embodiment, a base 1A and a stylus support portion 2A of the probe measuring force adjuster 1000 correspond to the base 1 and the stylus support portion 2 of the probe measuring force adjuster 100 according to the first embodiment, respectively. Plate springs 31A and 32A of the probe measuring force adjuster 1000 correspond to the plate springs 31 and 32 of the probe measuring force adjuster 100, respectively. Sliders SL1 and SL2 of the probe measuring force adjuster 1000 correspond to the columns 3A and 3B of the probe measuring force adjuster 100, respectively.

In addition, the probe measuring force adjuster 1000 has a configuration in which each of the permanent magnets 21 and 22 of the probe measuring force adjuster 100 are divided in two. That is, permanent magnets 21A and 21B attached to the slider SL1 of the probe measuring force adjuster 1000 correspond to the permanent magnet 21 of the probe measuring force adjuster 100. Permanent magnets 22A and 22B attached to the slider SL2 of the probe measuring force adjuster 1000 correspond to the permanent magnet 22 of the probe measuring force adjuster 100.

Further, in the probe measuring force adjuster 1000, guide rails GR1 and GR2 are provided to the base 1A. The slider SL1 is moveable in the Y direction along the guide rail GR1, and the slider SL2 is moveable in the Y direction along the guide rail GR2. In other words, the sliders SL1 and SL2 are moveable in the Y direction through application of force generated by external driving mechanism (not shown in the drawings) such as an external motor and the like.

The probe measuring force adjuster 1000 is configured so that the magnetic force between the permanent magnets facing each other in the X direction can be switched depending upon the position of the sliders SL1 and SL2 in the Y direction. That is, the probe measuring force adjuster 1000 is configured so that the magnetic force between the permanent magnet 11 and the permanent magnet 21A (referred to as a magnetic force M1A) is stronger than the magnetic force between the permanent magnet 11 and the permanent magnet 21B (referred to as a magnetic force M1B), and the magnetic force between the permanent magnet 12 and the permanent magnet 22A (referred to as a magnetic force M1C) is stronger than the magnetic force between the permanent magnet 12 and the permanent magnet 22B (referred to as a magnetic force M1D). In other words, in a space between permanent magnets, the magnetic force is changed in two stages in the Y direction.

However, the probe measuring force adjuster 1000 is configured so that the magnetic force MIA between the permanent magnet 11 and the permanent magnet 21A and the magnetic force M1C between the permanent magnet 12 and the permanent magnet 22A are equal, and the magnetic force M1B between the permanent magnet 11 and the permanent magnet 21B and the magnetic force M1D between the permanent magnet 12 and the permanent magnet 22B are equal.

A description is given of a specific example of the permanent magnets according to the present embodiment. The permanent magnet 11 and the permanent magnet 12 have an equal thickness (thickness in the X direction), the permanent magnet 21A and the permanent magnet 22A have an equal thickness (thickness in the X direction), and a space between the permanent magnet 11 and the permanent magnet 21A and a space between the permanent magnet 12 and the permanent magnet 22A is $\Delta X_1$. The permanent magnet 21B and the permanent magnet 22B have an equal thickness (thickness in the X direction), and a space between the permanent magnet 11 and the permanent magnet 21B and a space between the permanent magnet 12 and the permanent magnet 22B is $\Delta X_2$. In addition, in the present embodiment, each of the permanent magnets is designed so that $\Delta X_1$ is smaller than $\Delta X_2$ ($\Delta X_1 < \Delta X_2$).

Figure 26:
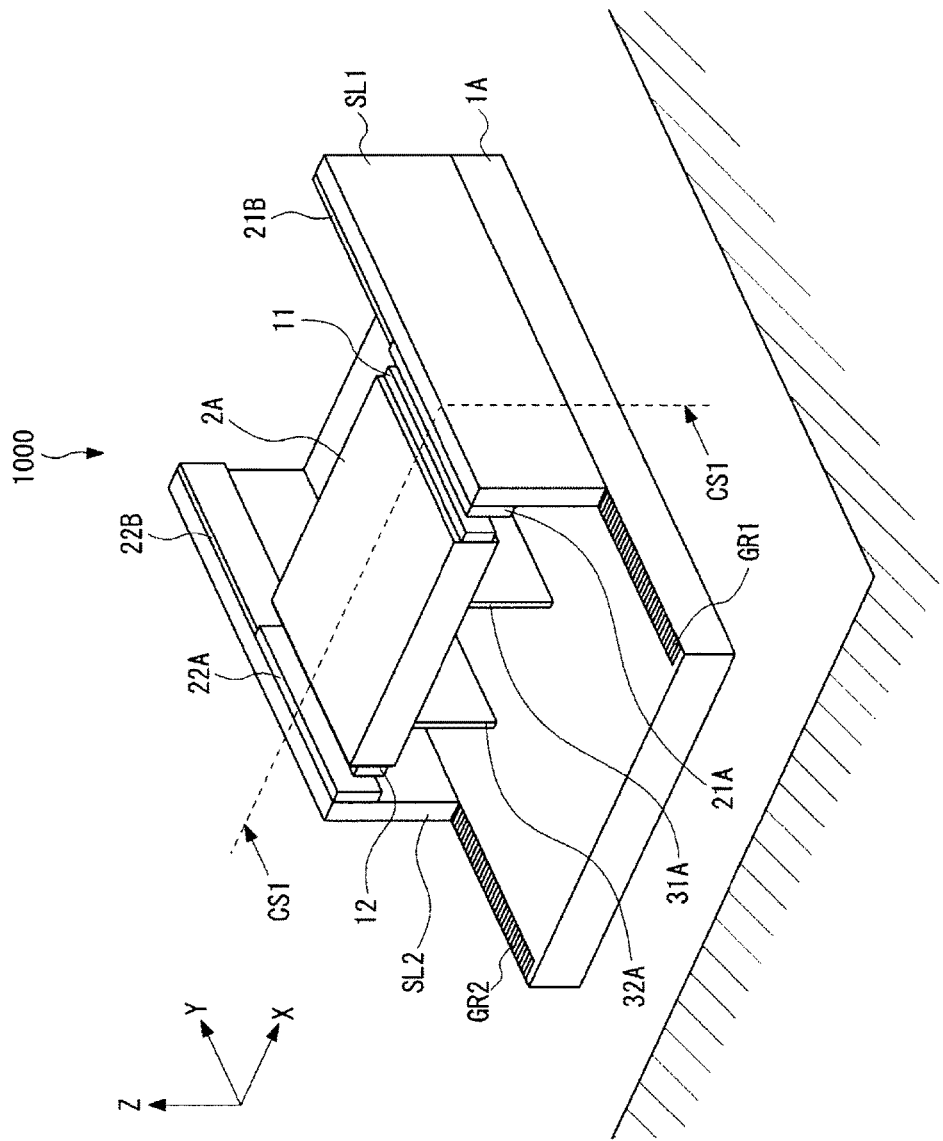
FIG. 26 is a perspective view illustrating the probe measuring force adjuster according to the tenth embodiment.
Figure 27:
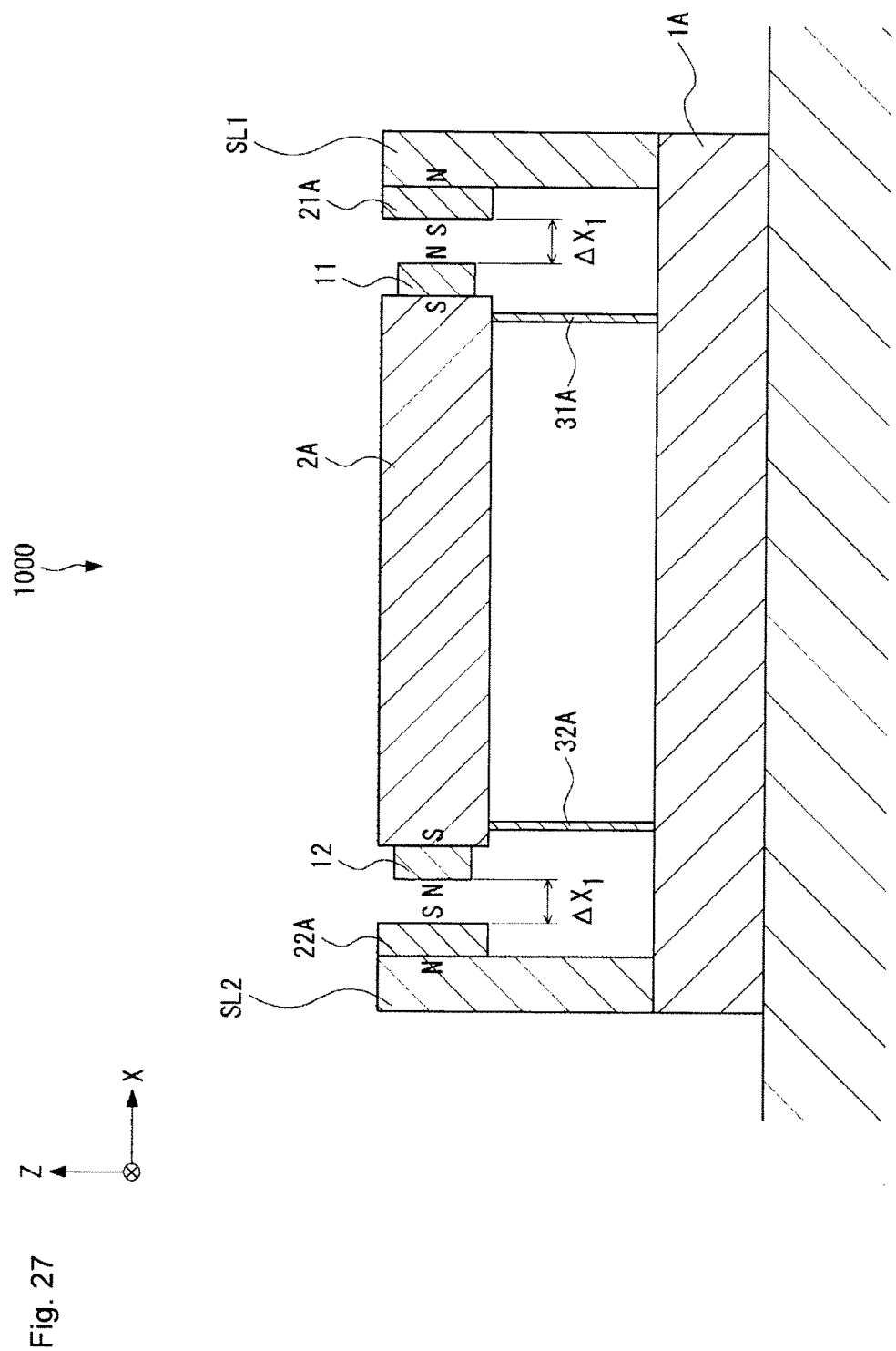
FIG. 27 is a cross-sectional view of the probe measuring force adjuster according to the tenth embodiment.

FIG. 26 is a perspective view illustrating the probe measuring force adjuster 1000 where the permanent magnet 21A faces the permanent magnet 11 and the permanent magnet 22A faces the permanent magnet 12. FIG. 27 is a cross-sectional view of the probe measuring force adjuster 1000 taken along a line CS1-CS1 illustrated in FIG. 26. As illustrated in FIG. 26, sliding the sliders SL1 and SL2 in the Y (+) direction causes the permanent magnet 21A to face the permanent magnet 11 and the permanent magnet 22A to face the permanent magnet 12.

Figure 28:
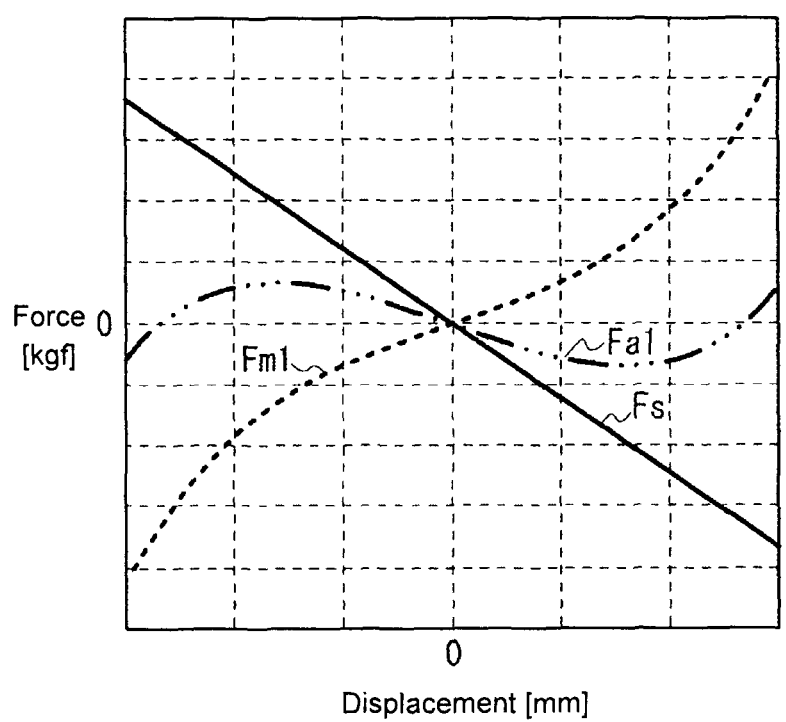
FIG. 28 is a graph illustrating the resultant force of the spring force and the magnetic force which acts upon the probe measuring force adjuster according to the tenth embodiment.

In this case, the space between the permanent magnet 11 and the permanent magnet 21A and the space between the permanent magnet 12 and the permanent magnet 22A become $\Delta X_1$. Accordingly, a strong magnetic force acts between opposing magnets. FIG. 28 is a graph illustrating the resultant force of the spring force and the magnetic force which acts upon the probe measuring force adjuster 1000 according to the tenth embodiment. As illustrated in FIG. 28, similar to the embodiment described above, the magnetic force Fm1 acts upon the stylus support portion 2 so as to cancel out the spring force Fs, thereby generating the resultant force (that is, the measuring force) Fa1. In this case, the spring constant of the probe measuring force adjuster 1000 as a whole is decreased due to the effect of the strong magnetic force Fm1. As a result, it is possible to inhibit the measuring force of the probe and perform highly accurate measurement.

Figure 29:
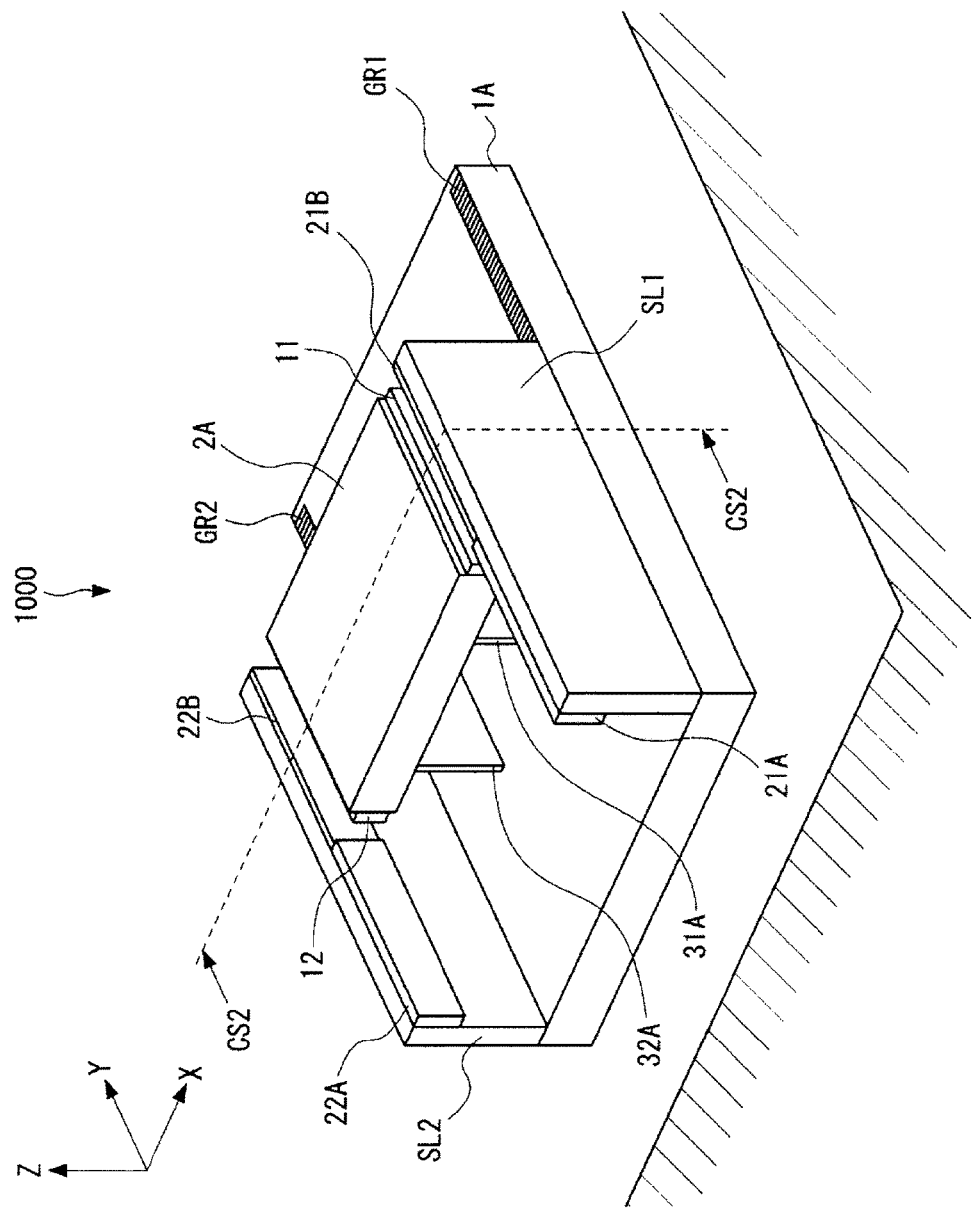
FIG. 29 is a perspective view illustrating the probe measuring force adjuster according to the tenth embodiment.
Figure 30:
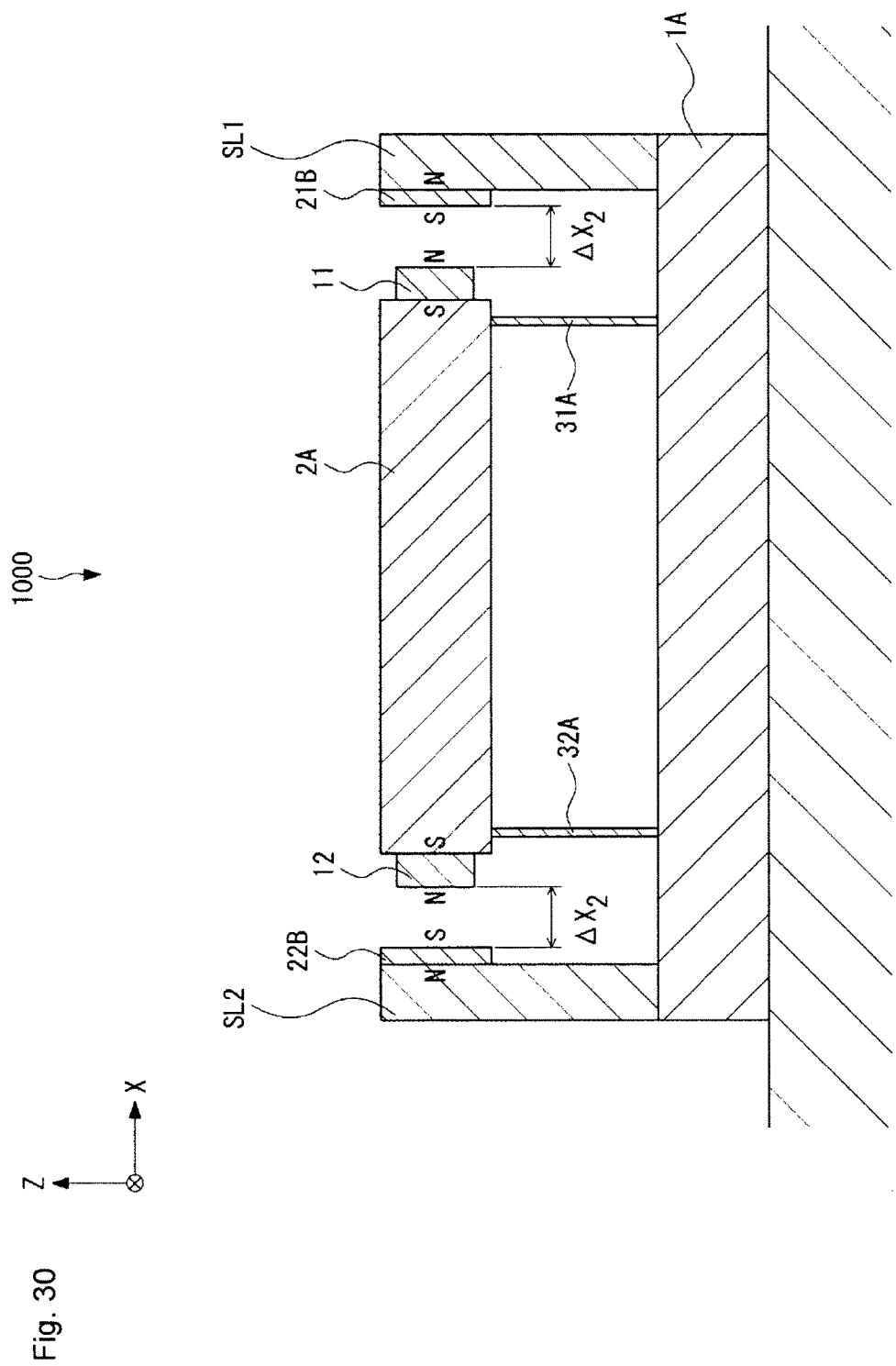
FIG. 30 is a cross-sectional view of the probe measuring force adjuster according to the tenth embodiment.

FIG. 29 is a perspective view illustrating the probe measuring force adjuster 1000 where the permanent magnet 21B faces the permanent magnet 11 and the permanent magnet 22B faces the permanent magnet 12. FIG. 30 is a cross-sectional view of the probe measuring force adjuster 1000 taken along a line CS2-CS2 illustrated in FIG. 29. As illustrated in FIG. 29, sliding the sliders SL1 and SL2 in the Y (−) direction causes the permanent magnet 21B to face the permanent magnet 11 and the permanent magnet 22B to face the permanent magnet 12.

Figure 31:
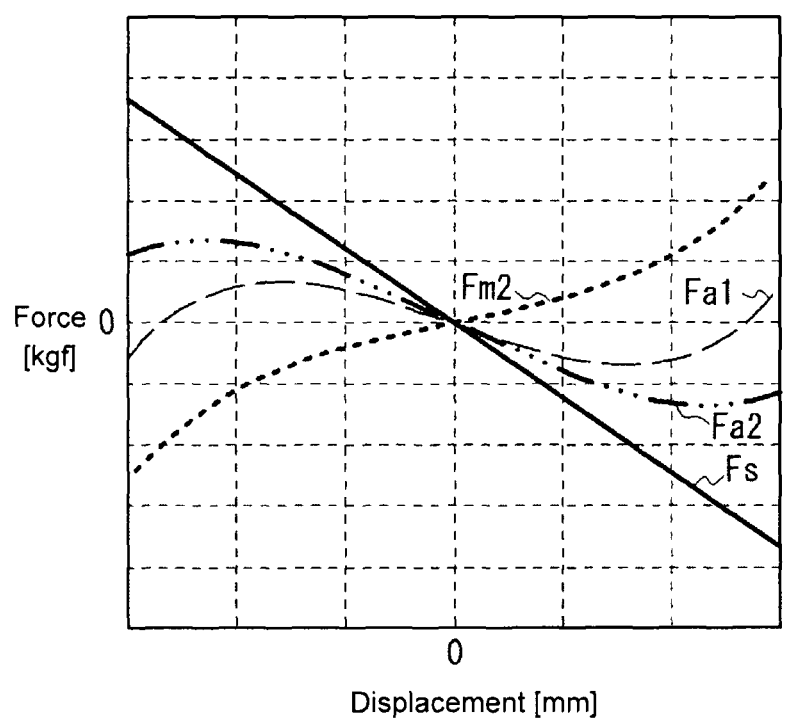
FIG. 31 is a graph illustrating the resultant force of the spring force and the magnetic force which acts upon the probe measuring force adjuster according to the tenth embodiment.

In this case, the space between the permanent magnet 11 and the permanent magnet 21B and the space between the permanent magnet 12 and the permanent magnet 22B become $\Delta X_2$. Accordingly, a weaker magnetic force as compared to FIGS. 26 and 27 acts between opposing magnets. FIG. 31 is a graph illustrating the resultant force of the spring force and the magnetic force which acts upon the probe measuring force adjuster 1000 according to the tenth embodiment. In this case, too, similar to the case of FIGS. 26 and 27, the magnetic force Fm2 acts upon the stylus support portion 2 so as to cancel out the spring force Fs, thereby generating the resultant force (that is, the measuring force) Fa2. In this case, since the acting magnetic force Fm2 is weak, the spring constant of the probe measuring force adjuster 1000 as a whole is increased. Accordingly, the measuring force Fa2 of FIG. 31 becomes greater than the measuring force Fa1 illustrated in FIG. 28. Accordingly, a natural frequency becomes higher, which is advantageous when performing highly responsive or high-speed measuring. Additionally, (the above-described embodiment) is suitable when using a long stylus in which a high spring constant is desirable when factors such as weight and angular moment are taken into account.

As described above, according to the present configuration, it is possible to switch the spring constant of the probe measuring force adjuster 1000 as a whole in accordance with measurement conditions.

Further, in the present configuration, it is possible to switch the spring constant of the probe measuring force adjuster 1000 by a simple operation of sliding the sliders SL1 and SL2. Therefore, energy required to move the sliders is provided only during a short period of time necessary to move the sliders, which hardly generates heat, such as frictional heat generated by movement of the sliders. Generation of heat generally causes measuring accuracy to deteriorate in measurements using probes. For example, where the probe measuring force is constantly controlled during measurement, such as when using a so-called active scanning probe, the heat generated by the control during measurement is generated continuously and leads to deterioration in measurement accuracy. By contrast, in the present configuration, it becomes possible to achieve high measurement accuracy since the sliders are moved in a state where no measuring is taking place, such as before commencing measurement, and no heat is generated during measurement.

Eleventh Embodiment

Figure 32:
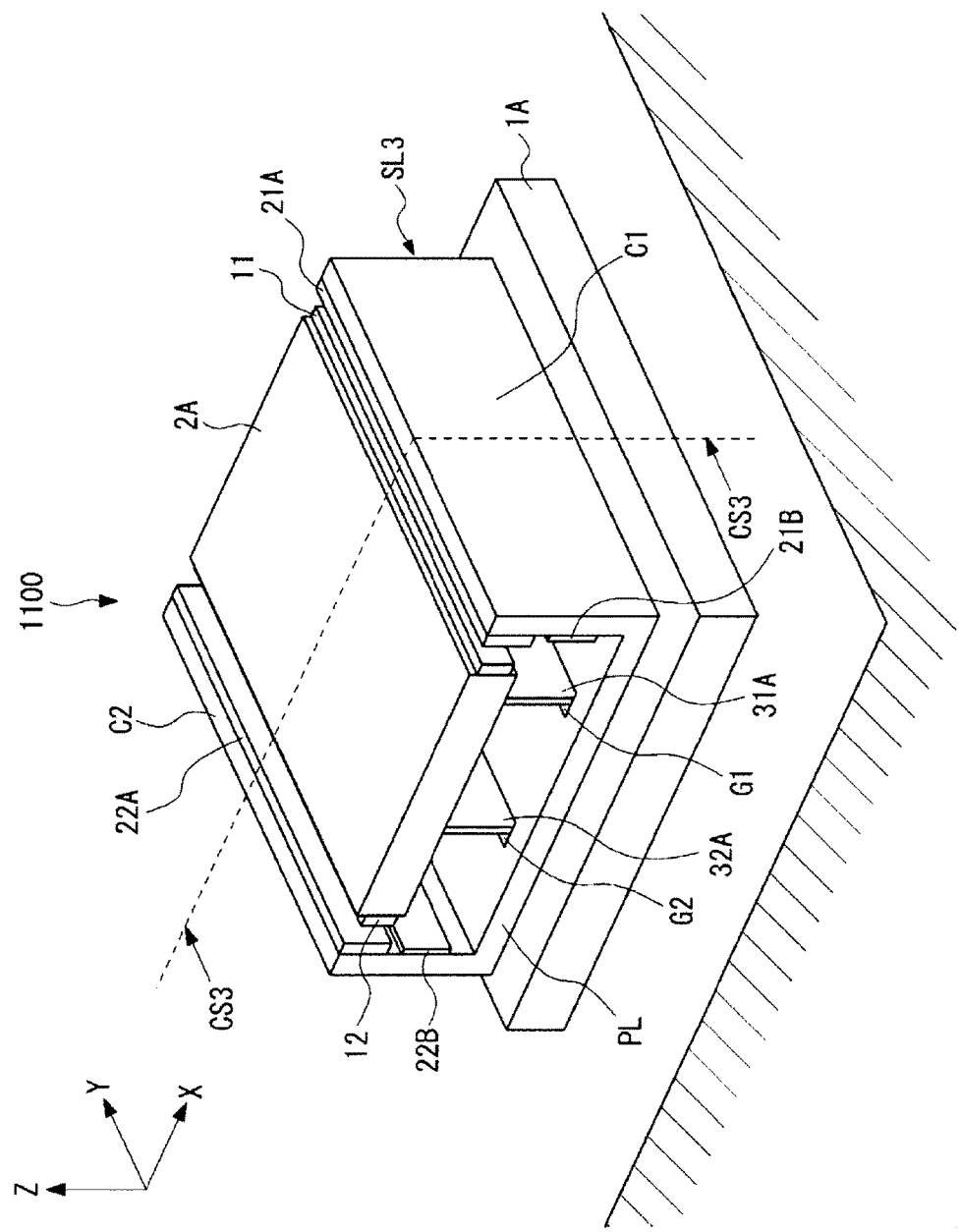
FIG. 32 is a perspective view schematically illustrating a configuration of a probe measuring force adjuster according to an eleventh embodiment.
Figure 33:
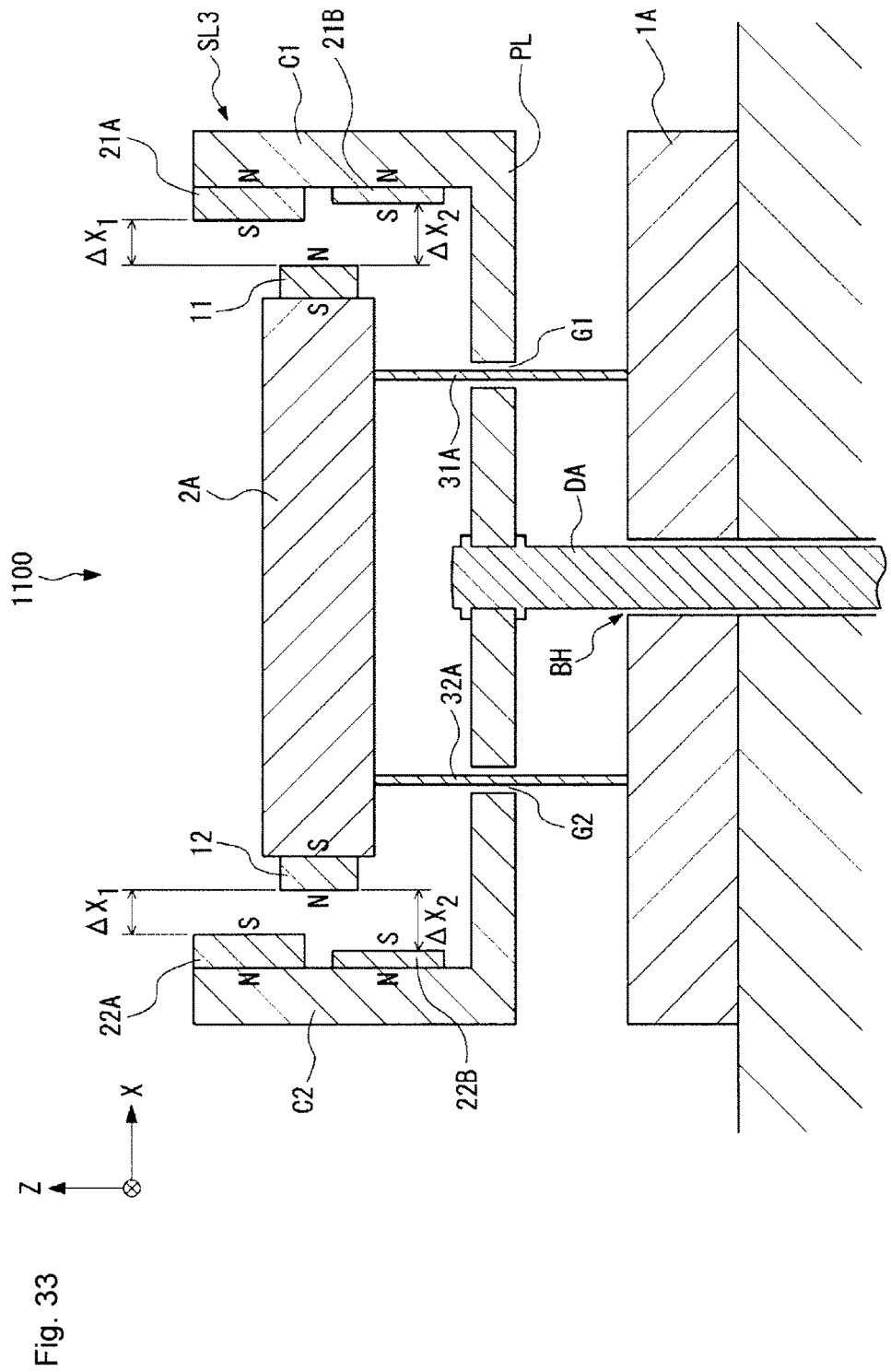
FIG. 33 is a cross-sectional view of the probe measuring force adjuster according to the eleventh embodiment.

A description is given of a probe measuring force adjuster 1100 according to an eleventh embodiment. The probe measuring force adjuster 1100 according to the present embodiment is configured as a modification of the probe measuring force adjuster 1000 according to the tenth embodiment. Whereas the sliders moved in the Y direction in the configuration of the probe measuring force adjuster 1000 according to the tenth embodiment, the probe measuring force adjuster 1100 according to the present embodiment has a configuration in which the slider moves in the Z direction. FIG. 32 is a perspective view schematically illustrating the configuration of the probe measuring force adjuster 1100 according to the eleventh embodiment. FIG. 33 is a cross-sectional view of the probe measuring force adjuster 1100 taken along a line CS3-CS3 illustrated in FIG. 32.

In the probe measuring force adjuster 1100, compared to the probe measuring force adjuster 1000, a slider SL3 moveable in the Z direction is provided instead of the sliders SL1 and SL2. The slider SL3 includes a plate PL that is provided so that the slider SL3 is separated from the base 1A in the Z (+) direction. Grooves G1 and G2 having a length direction in the Y direction are provided to the plate PL so that the plate springs 31A and 32A can be inserted thereinto, respectively. A drive axle DA, inserted through a hole BH provided to the base 1A, is joined to a center of the X-Y plane of the plate PL.

On the X (+) side of the permanent magnet 11, a column C1 is provided to rise from the plate PL in the Z (+) direction. On a surface of the column C1 on a side facing the permanent magnet 11 (X (−)-side surface), the permanent magnet 21A and the permanent magnet 21B are provided so as to be aligned in the Z direction. In the present embodiment, the permanent magnet 21A is provided on the Z (+) side with respect to the permanent magnet 21B.

On the X (−) side of the permanent magnet 12, a column C2 is provided to rise from the plate PL in the Z (+) direction. On a surface of the column C2 on a side facing the permanent magnet 12 (X (+)-side surface), the permanent magnet 22A and the permanent magnet 22B are provided so as to be aligned in the Z direction. In the present embodiment, the permanent magnet 22A is provided on the Z (+) side with respect to the permanent magnet 22B.

Since the permanent magnets 21A, 21B, 22A, and 22B are similar to that of the tenth embodiment, description thereof is omitted.

Figure 34:
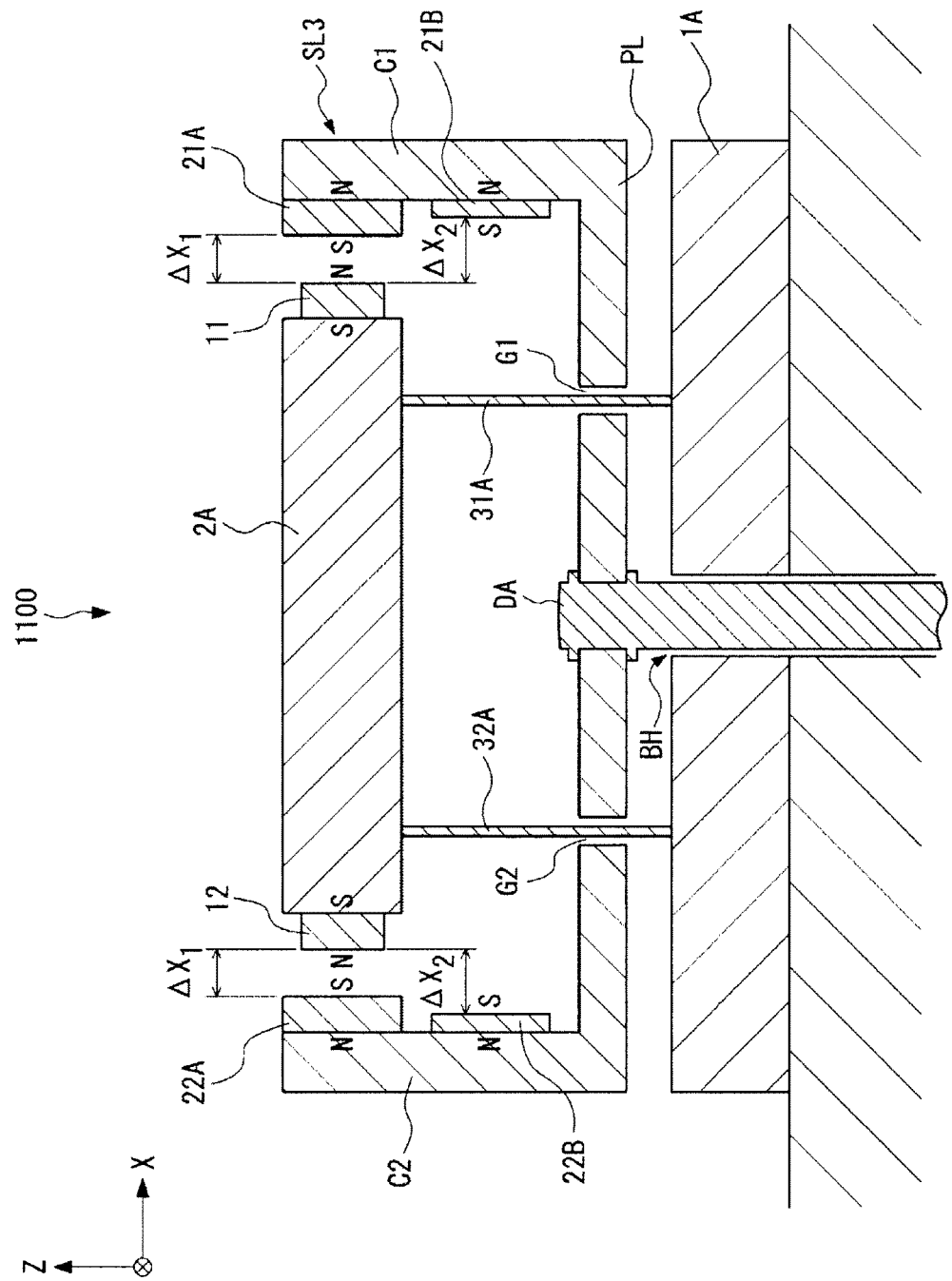
FIG. 34 is a cross-sectional view of the probe measuring force adjuster according to the eleventh embodiment.

Next, operation of the probe measuring force adjuster 1100 is described. FIG. 34 is a cross-sectional view where the slider SL3 is sliding in the Z (−) direction. As illustrated in FIG. 34, sliding the slider SL3 in the Z (−) direction causes the permanent magnet 21A to face the permanent magnet 11 and the permanent magnet 22A to face the permanent magnet 12. Thus, similar to the case of FIGS. 26 and 27 described in relation to the tenth embodiment, the space between the permanent magnet 11 and the permanent magnet 21A and the space between the permanent magnet 12 and the permanent magnet 22A become $\Delta X_1$. Accordingly, a strong magnetic force acts between opposing magnets.

As a result, similar to the case of FIG. 28 described in relation to the tenth embodiment, since the acting magnetic force Fm1 is strong, the spring constant of the probe measuring force adjuster 1000 as a whole is decreased. Therefore, it is possible to inhibit the measuring force of the probe and perform highly accurate measurement.

Figure 35:
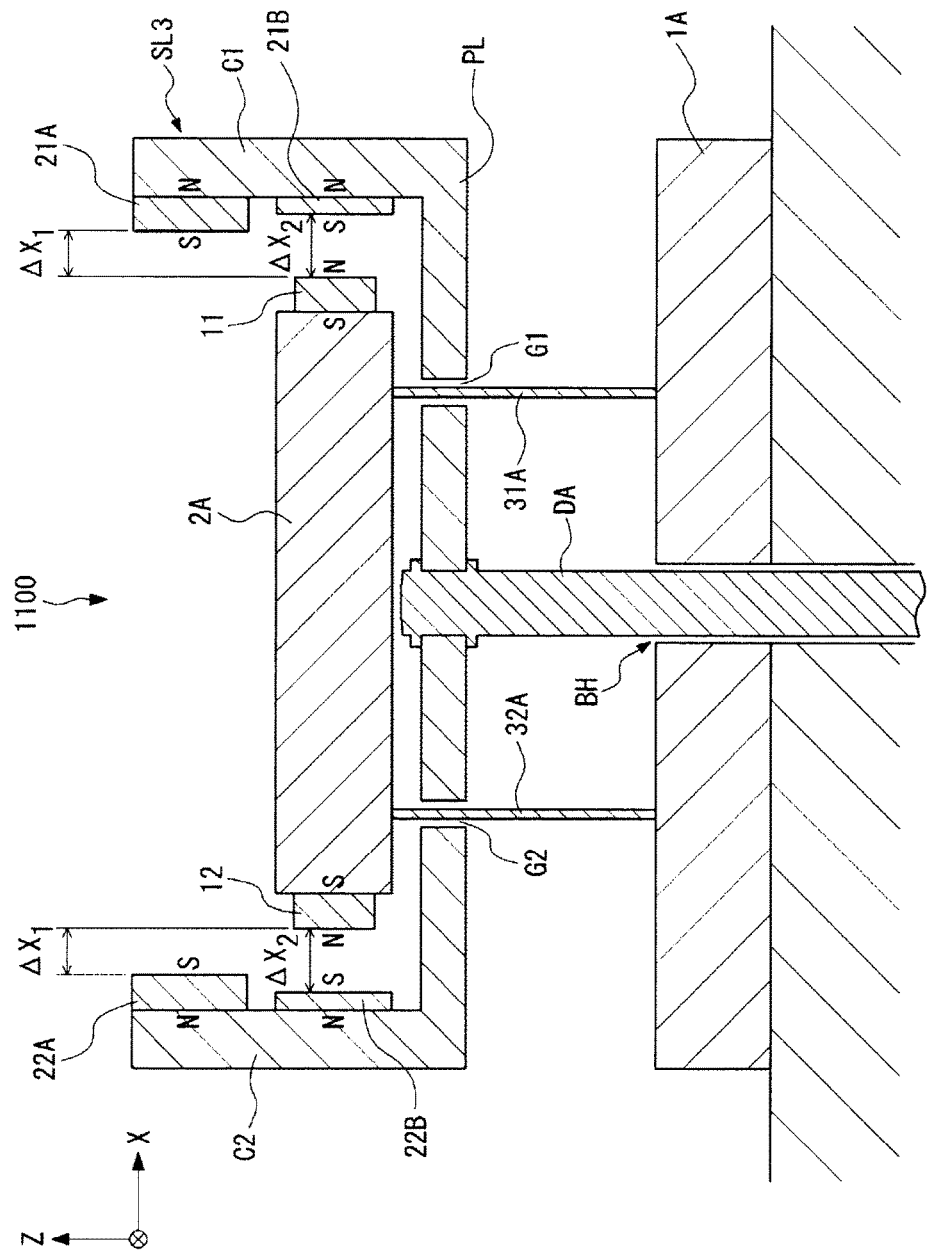
FIG. 35 is a cross-sectional view of the probe measuring force adjuster according to the eleventh embodiment.

FIG. 35 is a cross-sectional view where the slider SL3 is sliding in the Z (+) direction. As illustrated in FIG. 35, sliding the slider SL3 in the Z (+) direction causes the permanent magnet 21B to face the permanent magnet 11 and the permanent magnet 22B to face the permanent magnet 12. Thus, similar to the case of FIGS. 29 and 30 described in relation to the tenth embodiment, the space between the permanent magnet 11 and the permanent magnet 21B and the space between the permanent magnet 12 and the permanent magnet 22B become $\Delta X_2$. Accordingly, a weaker magnetic force Fm2 as compared to FIG. 34 acts between opposing magnets.

As a result, similar to the case of FIG. 31 described in relation to the tenth embodiment, since the acting magnetic force Fm2 is weak, the spring constant of the probe measuring force adjuster 1100 as a whole is increased. Accordingly, the natural frequency becomes higher, which is advantageous when performing highly responsive or high-speed measuring.

As described above, according to the present configuration, similar to the tenth embodiment, it is possible to switch the spring constant of the probe measuring force adjuster 1100 as a whole in accordance with measurement conditions. In addition, in the probe measuring force adjuster 1100, since only one driving force to be applied to the drive axle DA is needed for the slider, a configuration of a drive portion necessary to drive the slider can be simplified in comparison to the probe measuring force adjuster 1000, and the measuring force adjuster can be downsized.

Twelfth Embodiment

Figure 36:
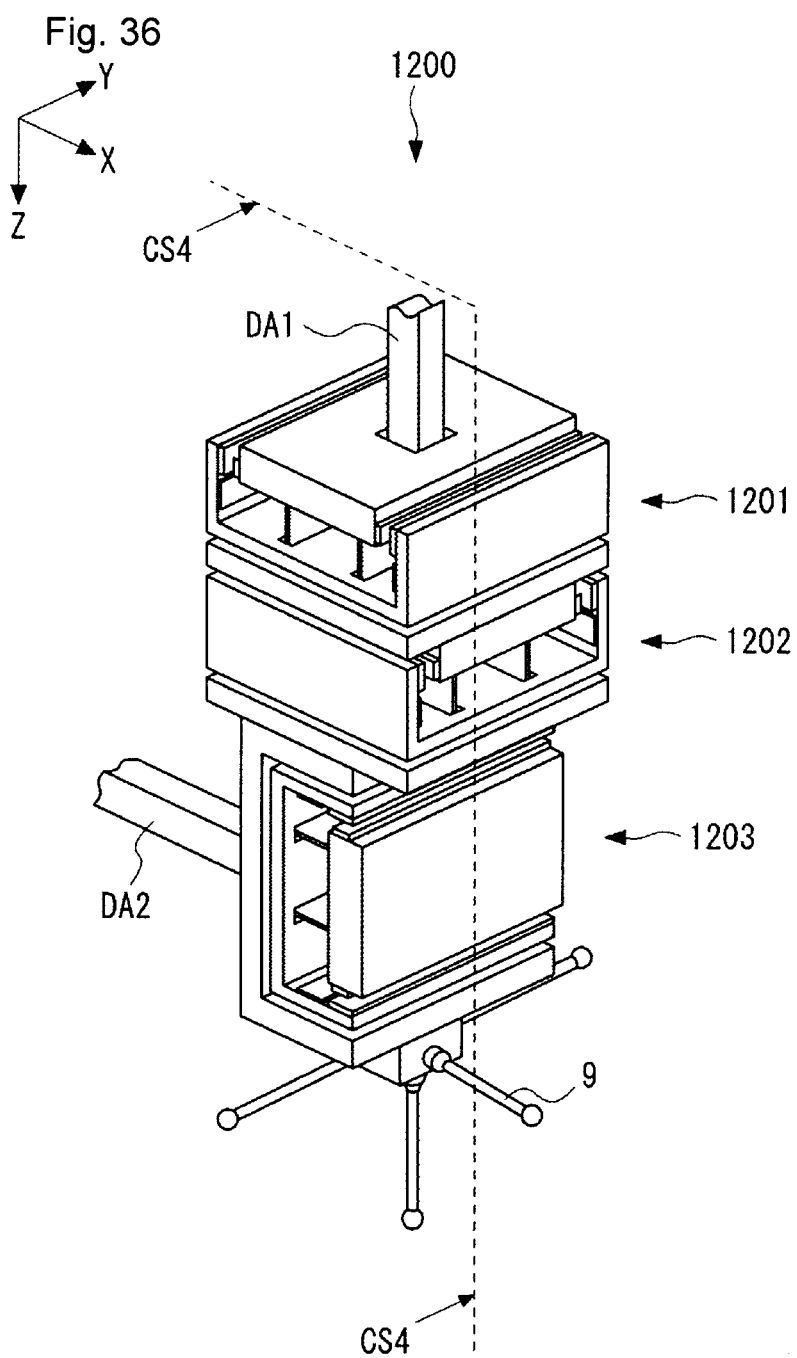
FIG. 36 is a perspective view schematically illustrating a configuration of a probe measuring force adjuster according to a twelfth embodiment.

A description is given of a probe measuring force adjuster 1200 according to a twelfth embodiment. The probe measuring force adjuster 1200 according to the present embodiment is configured as an applied example of the probe measuring force adjuster 1100 according to the eleventh embodiment, and has a configuration where the probe measuring force adjuster is provided to each of the three axes, similar to the probe measuring force adjuster 800 according to the eighth embodiment (FIG. 19). FIG. 36 is a perspective view schematically illustrating the configuration of the probe measuring force adjuster 1200 according to the twelfth embodiment. In order to simplify the figure, details of the mechanisms, etc., to attach the probe measuring force adjuster 1200 to the body of the measuring device are not shown in FIG. 36.

The probe measuring force adjuster 1200 has an X-axis measuring force adjuster portion 1201, a Y-axis measuring force adjuster portion 1202, and a Z-axis measuring force adjuster portion 1203. The X-axis measuring force adjuster portion 1201, the Y-axis measuring force adjuster portion 1202, and the Z-axis measuring force adjuster portion 1203 are modifications of the probe measuring force adjuster 1100 according to the eleventh embodiment. The X-axis measuring force adjuster portion 1201, the Y-axis measuring force adjuster portion 1202, and the Z-axis measuring force adjuster portion 1203 correspond to the X-axis measuring force adjuster portion 70, the Y-axis measuring force adjuster portion 80, and the Z-axis measuring force adjuster portion 90 of the probe measuring force adjuster 800 (FIG. 19), respectively.

The present embodiment is configured so that the magnetic force of the X-axis measuring force adjuster portion 1201 and the Y-axis measuring force adjuster portion 1202 is switched by a drive axle DA1, and the magnetic force of the Z-axis measuring force adjuster portion 1203 is switched by a drive axle DA2.

Figure 37:
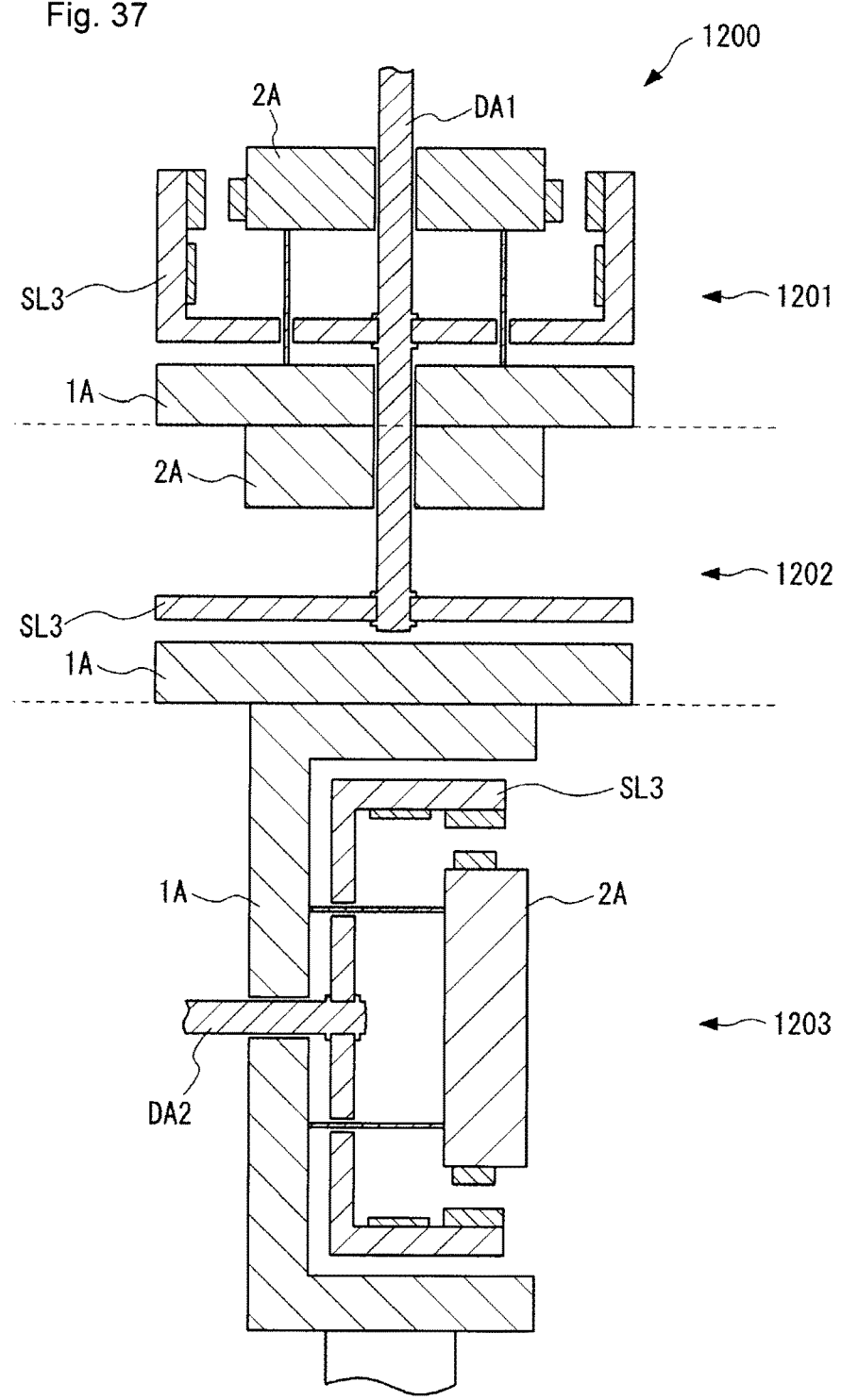
FIG. 37 is a cross-sectional view of the probe measuring force adjuster according to the twelfth embodiment.

FIG. 37 is a cross-sectional view of the probe measuring force adjuster 1200 taken along a line CS4-CS4 illustrated in FIG. 36. The X-axis measuring force adjuster portion 1201 has a configuration where a manner in which the drive axle is joined is modified from the measuring force adjuster 1100 according to the eleventh embodiment. In the X-axis measuring force adjuster portion 1201, the drive axle DA1 (corresponds to drive axle DA in the probe measuring force adjuster 1100) penetrates a hole provided to the stylus support portion 2A and is pulled out in the Z (+) direction.

The Y-axis measuring force adjuster portion 1202 has a configuration where the probe measuring force adjuster 1100 according to the eleventh embodiment is rotated by 90 degrees around the Z axis and the manner in which the drive axle is joined is modified. The drive axle DA1 (corresponds to the drive axle DA in the probe measuring force adjuster 1100) projecting from the base 1A of the probe measuring force adjuster 1201 penetrates the hole provided to the stylus support portion 2A of the Y-axis measuring force adjuster portion 1202 and is joined to the slider SL3.

As described above, by driving the drive axle DA1, the magnetic force of the X-axis measuring force adjuster portion 1201 and the Y-axis measuring force adjuster portion 1202 can be switched collectively using one power source.

The Z-axis measuring force adjuster portion 1203 has a configuration where the probe measuring force adjuster 1100 according to the eleventh embodiment is rotated by 90 degrees around the Y axis. The drive axle DA2 (corresponds to the drive axle DA in the probe measuring force adjuster 1100) is joined to the slider SL3 of the Z-axis measuring force adjuster portion 1203. The drive axle DA2 is driven by a separate power source from the drive axle DA1.

Given the above, according to the present configuration, it can be understood that when the probe is displaced in the triaxial direction (the X, Y, and Z directions), the magnetic force acts in the triaxial direction (the X, Y, and Z directions) to cancel out the spring force generated by the displacement. Therefore, it becomes possible to inhibit the magnitude of the force in the triaxial direction (the X, Y, and Z directions) materially acting upon the probe and to equalize the magnitude of the force. As a result, the measuring force acting upon the measured object can be inhibited and equalized.

In addition, similar to the tenth and eleventh embodiments, by switching the magnetic forces acting between permanent magnets, it is possible to change the responsiveness of the probe. Moreover, since it is possible to switch the magnetic forces of two of the three axis measuring force adjuster portions using one power source (one drive axle), a simplified configuration is possible compared to where a power source is assigned to each of the three axis measuring force adjuster portions.

Other Embodiments

It is noted that the present invention is not limited to the embodiments described above, and may be modified as needed without departing from the scope of the present invention. For example, with respect to the probe measuring force adjuster according to the second through ninth embodiments, the magnetic poles of the first and third magnetic members may be switched and the magnetic poles of the second and fourth magnetic members may be switched.

With respect to the probe measuring force adjuster according to the second through eighth embodiments, one of the first and third magnetic members may be the magnetic body and one of the second and fourth magnetic members may be the magnetic body.

The X-axis measuring force adjuster portion 70, the Y-axis measuring force adjuster portion 80, and the Z-axis measuring force adjuster portion 90 described above may have a configuration other than that of the probe measuring force adjuster 100, such as the similar configuration of the probe measuring force adjusters according to the embodiments described above. In addition, the X-axis measuring force adjuster portion 70, the Y-axis measuring force adjuster portion 80, and the Z-axis measuring force adjuster portion 90 may each have the same configuration or have different configurations as long as it is a probe measuring force adjuster according to the embodiments described above.

In the tenth and eleventh embodiments described above, the permanent magnet 21A and the permanent magnet 21B, for example, are described as having the same magnetic flux density and having different thickness in the X direction; however, this is merely exemplary. That is, as long as the magnetic force generated between the permanent magnets attached to the stylus support portion and the permanent magnets attached to the slider can be switched by moving the slider, the permanent magnets may have other configurations.

For example, the permanent magnet 21A and the permanent magnet 21B may have the same thickness and different magnetic flux densities. In this case, the distance between opposing permanent magnets is unchanged even when the magnetic force is switched. Accordingly, in this case, a stroke by which the stylus support portion can be displaced is also unchanged. Therefore, even when the magnetic force between the permanent magnets is made stronger, the displacement stroke of the stylus support portion can be prevented from being limited.

For example, the permanent magnet 21A and the permanent magnet 21B may have the same magnetic flux density and thickness. In this case, a difference may be created between the distance between the permanent magnets 21A and 11 and the distance between the permanent magnets 21B and 11 by inserting a spacer between the slider and at least one of the permanent magnet 21A and the permanent magnet 21B. In addition, a magnet which is ring-shaped when viewed from the X direction may be used as at least one of the permanent magnet 21A and permanent magnet 21B, and a difference may be created between the magnetic force between the permanent magnets 21A and 11 and the magnetic force between the permanent magnets 21B and 11 by inserting a ferromagnetic core material such as steel into a hole in a center of the ring-shaped magnet In the tenth and eleventh embodiments described above, the permanent magnet 21A and the permanent magnet 21B, for example, are described as having the same magnetic flux density and having different thickness in the X direction; however, similar to the permanent magnet 21A and the permanent magnet 21B described above, this is merely exemplary. That is, as long as the magnetic force generated between the permanent magnets attached to the stylus support portion and the permanent magnets attached to the slider can be switched by moving the slider, the permanent magnets may have other configurations.

For example, the permanent magnet 22A and the permanent magnet 22B may have the same thickness and have different magnetic flux densities. In this case, the distance between opposing permanent magnets is unchanged even when the magnetic force is switched. Accordingly, in this case, the stroke by which the stylus support portion can be displaced is also unchanged. Therefore, even when the magnetic force between the permanent magnets is made stronger, the displacement stroke of the stylus support portion can be prevented from being limited.

Further, the permanent magnet 22A and the permanent magnet 22B may have the same magnetic flux density and thickness. In this case, a difference may be created between the distance between the permanent magnets 22A and 12 and the distance between the permanent magnets 22B and 12 by inserting a spacer between the slider and at least one of the permanent magnet 22A and the permanent magnet 22B. In addition, a magnet which is ring-shaped when viewed from the X direction may be used as at least one of the permanent magnet 22A and permanent magnet 22B, and a difference may be created between the magnetic force between the permanent magnets 22A and 12 and the magnetic force between the permanent magnets 22B and 12 by inserting a ferromagnetic core material such as steel into a hole in a center of the ring-shaped magnet.

In the tenth and eleventh embodiments described above, a description was given of an example in which the permanent magnet to be used as one of the two permanent magnets is switched. However, the permanent magnets subjects to switching may be three or more. In addition, in the tenth and eleventh embodiments described above, a description was given of an example in which the sliders moved in one of the Y and Z directions. However, in a case where there are three or more permanent magnets subject to switching, a rotation mechanism portion having the X axis as the rotation axis to the column, for example, may be provided, and the three or more permanent magnets may be arranged along a circumference of the rotation mechanism portion. In this case, by rotating the rotation mechanism portion, one of the three or more permanent magnets may be made to face the permanent magnet attached to the stylus support portion.

In the tenth and eleventh embodiments described above, a description was given of an example in which the permanent magnets to be used are switched by moving the sliders. However, the magnetic force between the permanent magnets attached to the stylus support portion and the permanent magnets attached to the sliders may be switched by using the same permanent magnets and by moving the sliders in the X direction, thereby changing the distance between the permanent magnets attached to the stylus support portion and the permanent magnets attached to the sliders. In addition, a mechanism may be provided which causes the permanent magnets attached to the column to be displaced in the X direction. In this case, the movement of the sliders does not need to be limited to two stages but can have three or more stages.

In the tenth and eleventh embodiment described above, a description was provided of an example in which the sliders are moved by an external motor and the like; however, the power source is not limited to a motor and it is possible to apply various types of power source, such as operation by hand and electric field-responsive gels which expand/contract upon application of air pressure and voltage.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A probe measuring force adjuster, comprising:
    a frame;
    a support moveable in a first direction and arranged separate from the frame;
    a first spring having a first end fixed to a first end of the support, a second end fixed to the frame, and a principal surface facing the first direction;
    a second spring having a first end fixed to a second end which second end is separated from the first end of the support in the first direction, a second end fixed to the frame, and a principal surface facing the first direction;
    a first magnet provided to the first end of the support;
    a second magnet provided to the second end of the support;
    a third magnet provided to the frame and arranged separate from the first magnet so as to generate a magnetic force in the first direction between the first magnet and the third magnet; and
    a fourth magnet provided to the frame and arranged separate from the second magnet so as to generate the magnetic force in the first direction between the second magnet and the fourth magnet,
    wherein the first through fourth magnets are permanent magnets.

2. The probe measuring force adjuster according to claim 1, wherein an attraction force acts on an area between the first magnet and the third magnet and an area between the second magnet and the fourth magnet.

3. The probe measuring force adjuster according to claim 1, wherein a repulsive force acts on the area between the first magnet and the third magnet and the area between the second magnet and the fourth magnet.

4. The probe measuring force adjuster according to claim 1, wherein the first spring and the second spring are plate springs.

5. A probe measuring force adjuster, comprising first and second measuring force adjusters each of which comprises a probe measuring force adjuster according to claim 1, wherein:
    the second measuring force adjuster is configured to be rotated by 90 degrees around a rotation axis of a second direction perpendicular to the first direction with respect to the first measuring force adjuster, and
    the support of the first measuring force adjuster and the frame of the second measuring force adjuster are connected.

6. The probe measuring force adjuster according to claim 1, wherein the third magnet is configured such that the magnetic pole of the third magnet is switchable, and the fourth magnet is configured such that the magnetic pole of the fourth magnet is switchable.

7. A probe measuring force adjuster, comprising:
a frame;
a support moveable in a first direction and arranged separate from the frame;
a first spring having a first end fixed to a first end of the support, a second end fixed to the frame, and a principal surface facing the first direction;
a second spring having a first end fixed to a second end which second end is separated from the first end of the support in the first direction, a second end fixed to the frame, and a principal surface facing the first direction;
a first magnet provided to the first end of the support;
a second magnet provided to the second end of the support;
a third magnet provided to the frame and arranged separate from the first magnet so as to generate a magnetic force in the first direction between the first magnet and the third magnet; and
a fourth magnet provided to the frame and arranged separate from the second magnet so as to generate the magnetic force in the first direction between the second magnet and the fourth magnet,
wherein one of the first magnet and the third magnet is a permanent magnet and the other is a magnetic body, and one of the second magnet and the fourth magnet is a permanent magnet and the other is a magnetic body.

8. A probe measuring force adjuster, comprising:
a frame;
a support moveable in a first direction and arranged separate from the frame;
a stylus attached to the support;
a first spring having a first end fixed to a first end of the support, a second end fixed to the frame, and a principal surface facing the first direction;
a second spring having a first end fixed to a second end which second end is separated from the first end of the support in the first direction, a second end fixed to the frame, and a principal surface facing the first direction;
a first magnet provided to the first end of the support;
a second magnet provided to the second end of the support;
a third magnet provided to the frame and arranged separate from the first magnet so as to generate a magnetic force in the first direction between the first magnet and the third magnet; and
a fourth magnet provided to the frame and arranged separate from the second magnet so as to generate the magnetic force in the first direction between the second magnet and the fourth magnet.

\* \* \* \* \*